(12) United States Patent
Hariya et al.

(10) Patent No.: US 12,706,541 B2
(45) Date of Patent: Aug. 11, 2026

(54) ELECTRIC POWER CONVERSION APPARATUS AND ELECTRIC POWER CONVERSION SYSTEM

(71) Applicant: TDK CORPORATION, Tokyo (JP)

(72) Inventors: Akinori Hariya, Tokyo (JP); Kenji Negoro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 246 days.

(21) Appl. No.: 18/719,107

(22) PCT Filed: Mar. 25, 2022

(86) PCT No.: PCT/JP2022/014431

§ 371 (c)(1),
(2) Date: Jun. 12, 2024

(87) PCT Pub. No.: WO2023/181361

PCT Pub. Date: Sep. 28, 2023

(65) Prior Publication Data

US 2026/0155752 A1 Jun. 4, 2026

(51) Int. Cl.
*H02M 3/335* (2006.01)
*H02M 1/088* (2006.01)
(Continued)

(52) U.S. Cl.
CPC ....... *H02M 3/33573* (2021.05); *H02M 1/088* (2013.01); *H02M 1/32* (2013.01);
(Continued)

(58) Field of Classification Search
CPC ..... H02M 3/335–33592; H02M 1/088; H02M 1/36
See application file for complete search history.

(56) References Cited

U.S. PATENT DOCUMENTS 7,724,046 B2 * 5/2010 Wendt ................ H03K 17/6872
327/110
2017/0033696 A1 * 2/2017 Handa ............... H02M 3/33584
(Continued)

FOREIGN PATENT DOCUMENTS

JP 2017-034982 A 2/2017
JP 2017-55589 A 3/2017
JP 2018-061381 A 4/2018

*Primary Examiner* — Gary L Laxton
*Assistant Examiner* — Jennifer C Caulk
(74) *Attorney, Agent, or Firm* — Oliff PLC

(57) ABSTRACT

An electric power conversion apparatus includes a first electric power terminal, a switcher, a transformer, a rectifier with a switching circuit including first and second switching devices, a smoother, a second electric power terminal, a controller, and a driver driving the switching circuit. The switching circuit includes a first device that is provided on a path coupling a first terminal and a control terminal of the first switching device to each other, and that is configured to clamp a voltage. The driver is configured to output a first control signal and a second control signal from a first output terminal and a second output terminal, respectively. The controller is configured to control operation to cause electric power to be supplied from the second electric power terminal toward the first electric power terminal, and set an output impedance of the first output terminal of the driver to a high impedance state.

15 Claims, 17 Drawing Sheets

(51) Int. Cl.
*H02M 1/32* (2007.01)
*H02M 1/36* (2007.01)

(52) U.S. Cl.
CPC ......... *H02M 1/36* (2013.01); *H02M 3/33576* (2013.01); *H02M 3/33546* (2013.01); *H02M 3/33584* (2013.01)

(56) References Cited

U.S. PATENT DOCUMENTS

2018/0034360 A1* 2/2018 Hirabayashi ...... H02M 3/33584
2022/0345126 A1* 10/2022 Harriman ............. H02M 3/158

* cited by examiner 1
10
BL
T21
T22
L21B
18
V
VL
15
16
17
L22
19
VL
14
S6
TA
TB
GE1
GE2
26
DRIVER
GE
S5
TA
TB
GF1
GF2
25
DRIVER
GF
SSW3
CONTROLLER
N4
L21A
N3
29
AUXILIARY POWER SUPPLY CIRCUIT
VDD
SGND
13
13B
13C
13A
12
S3
D3
S4
D4
GC1
GD1
N1
N2
S1
D1
S2
D2
L11
L12
GA1
GB1
21
DRIVER
GA1 ~ GD1
GA ~ GD
VH
VH
11
V
T11
T12
SW1
SW2
BH
9

[ FIG. 2 ]
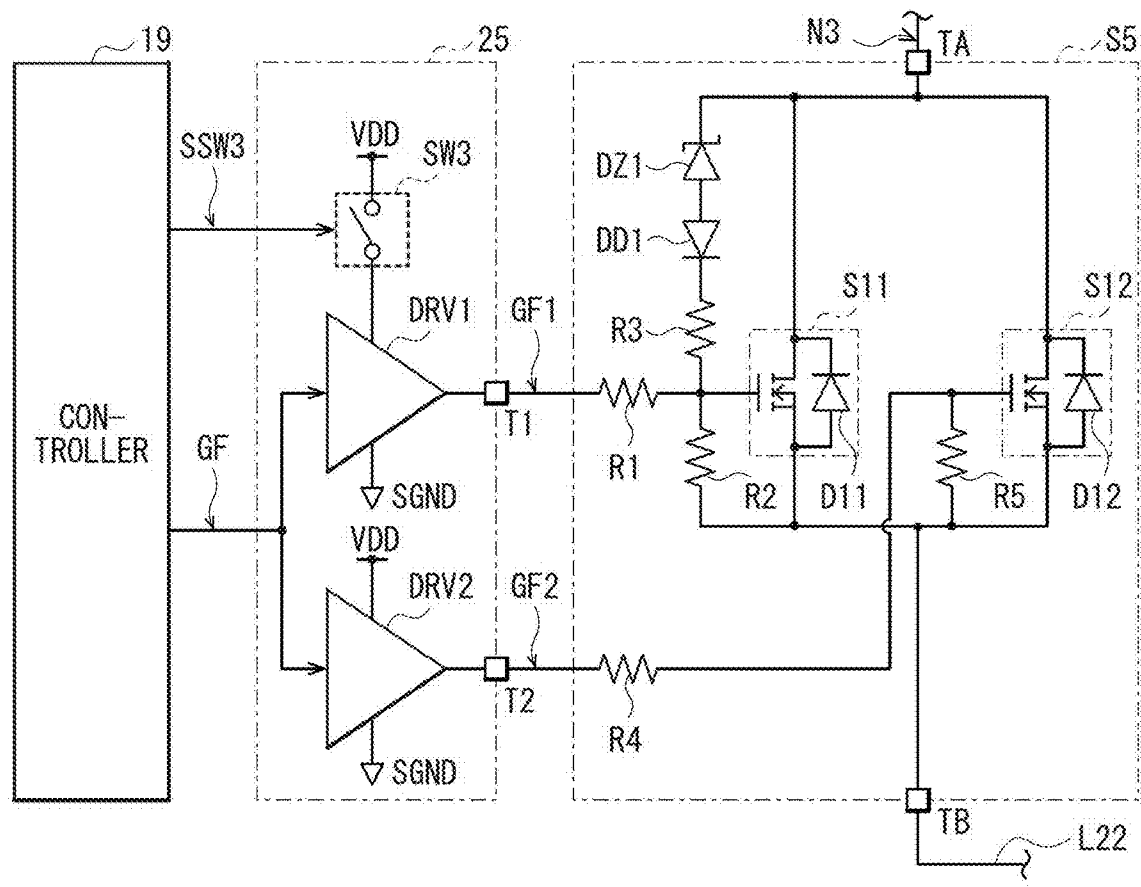
[ FIG. 3 ]
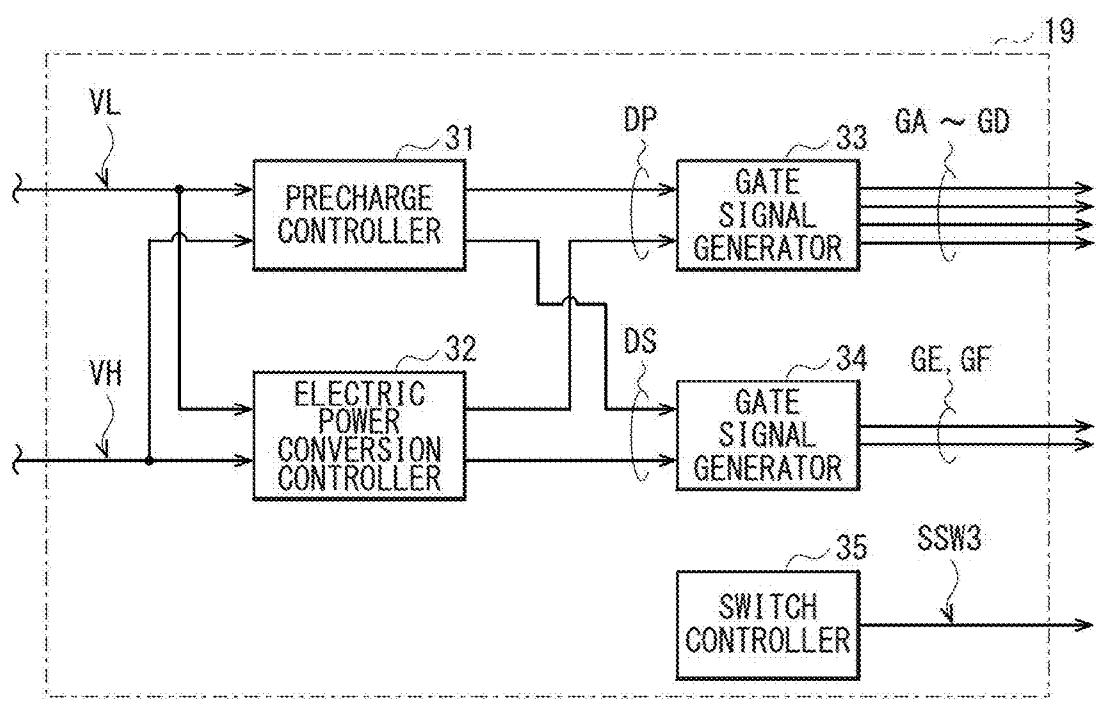

[ FIG. 4 ]

T
GF
GE
(A) GATE SIGNALS GE, GF
0
GC
GD
(B) GATE SIGNALS GC, GD
0
(C) CHARGE CURRENT ICHG
0
(D) INDUCTOR CURRENT IL
0
(E) TRANSFORMER VOLTAGE VTR1
0
(F) DRAIN-SOURCE VOLTAGE VDSF
0
(G) VOLTAGE VH
0
t11
t12
t13

[ FIG. 5 ]
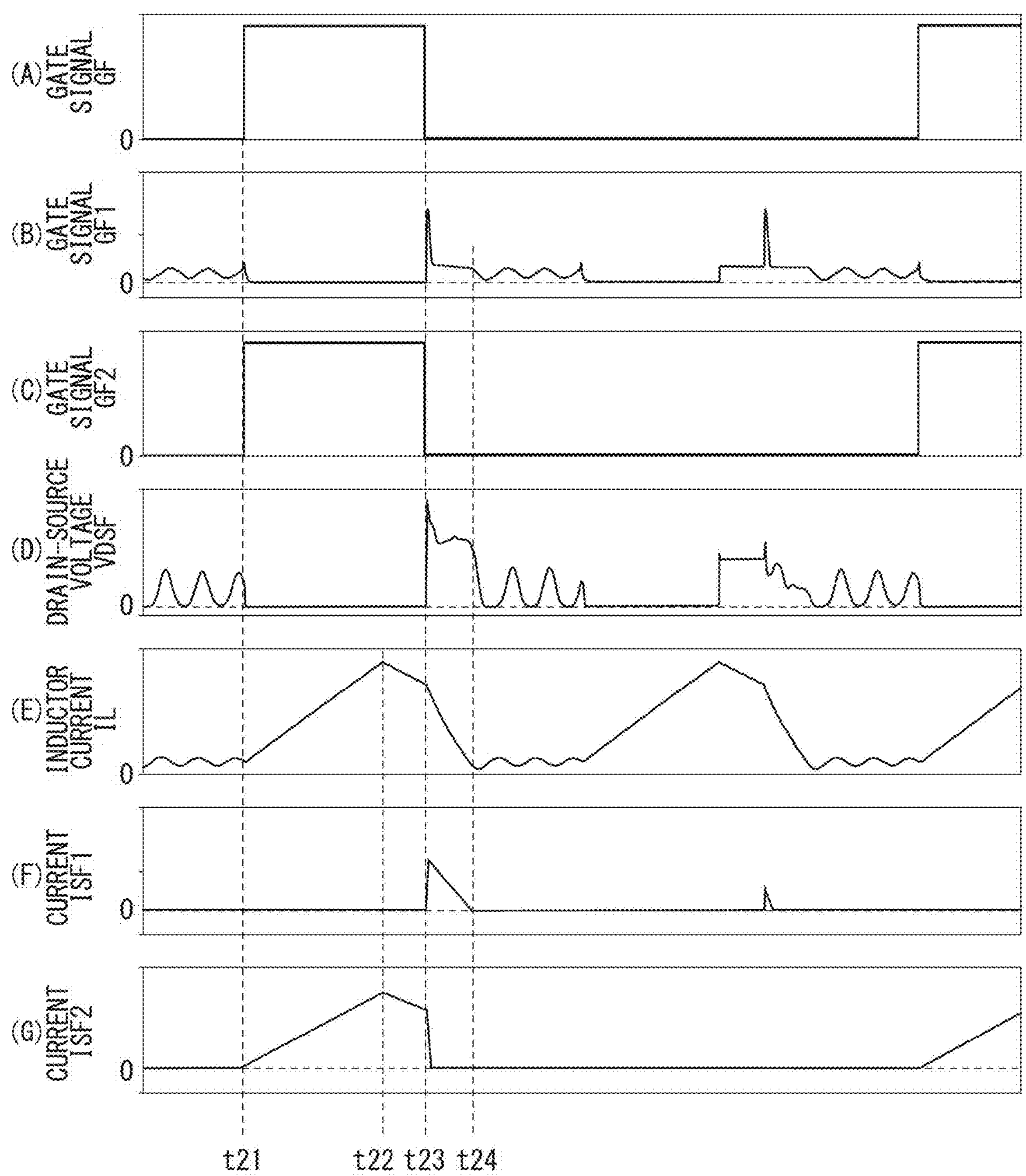

[ FIG. 6 ]
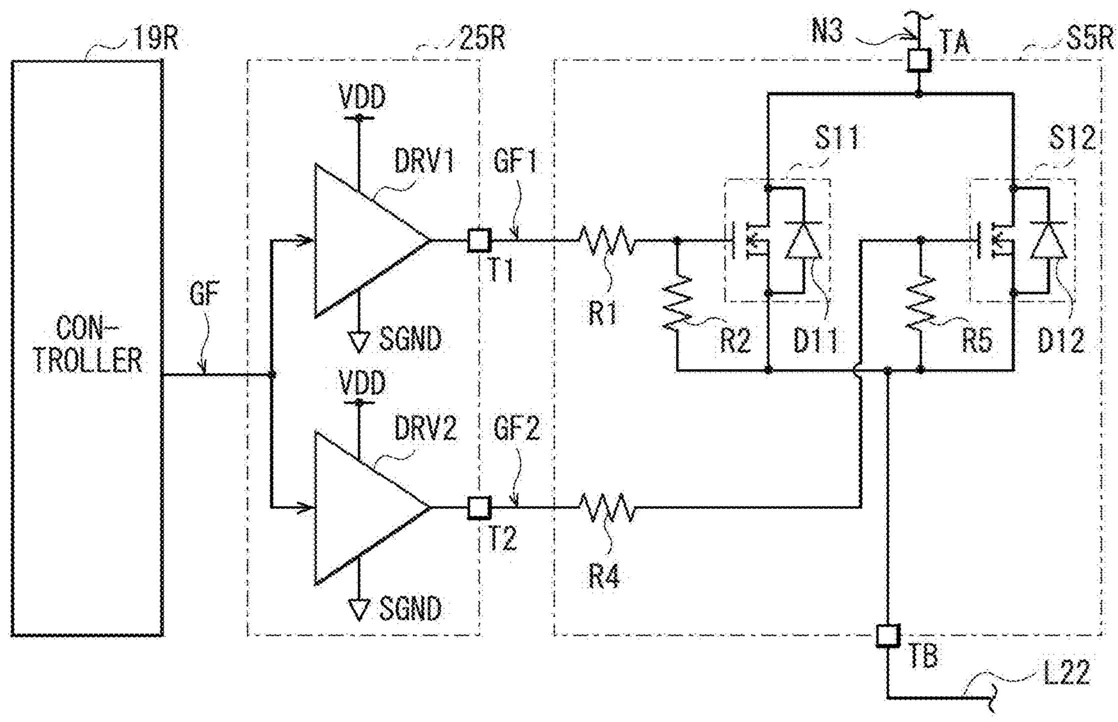
[ FIG. 7 ]
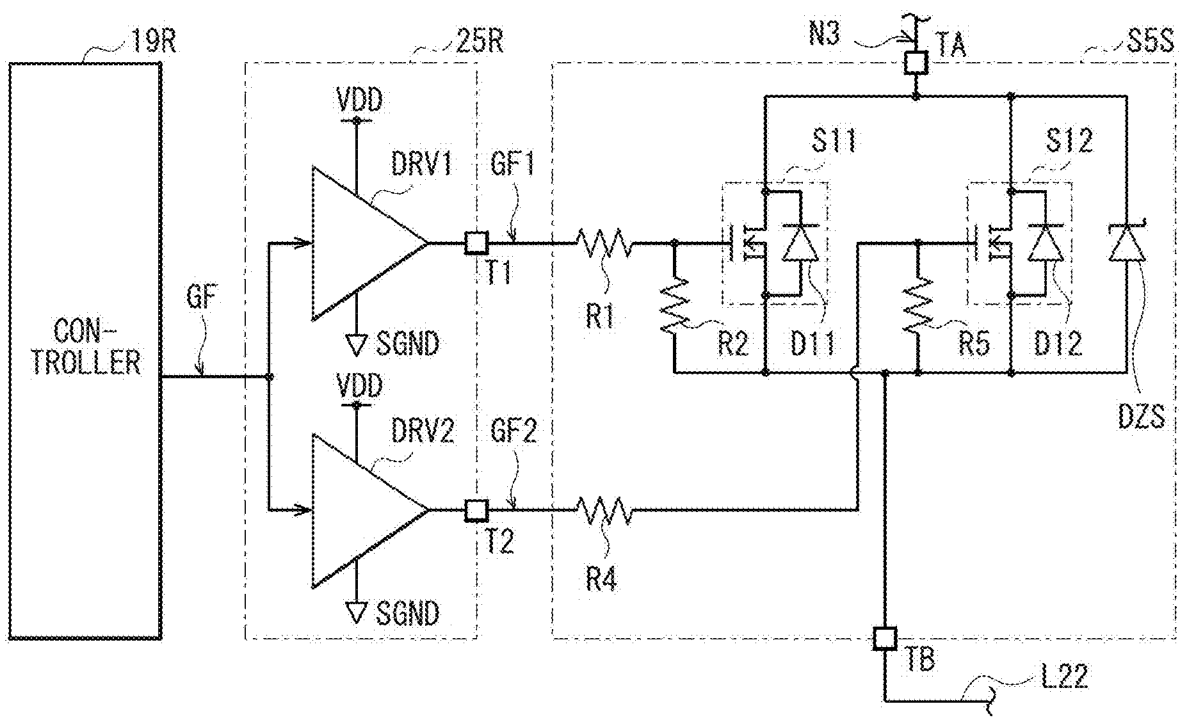

[ FIG. 8 ]
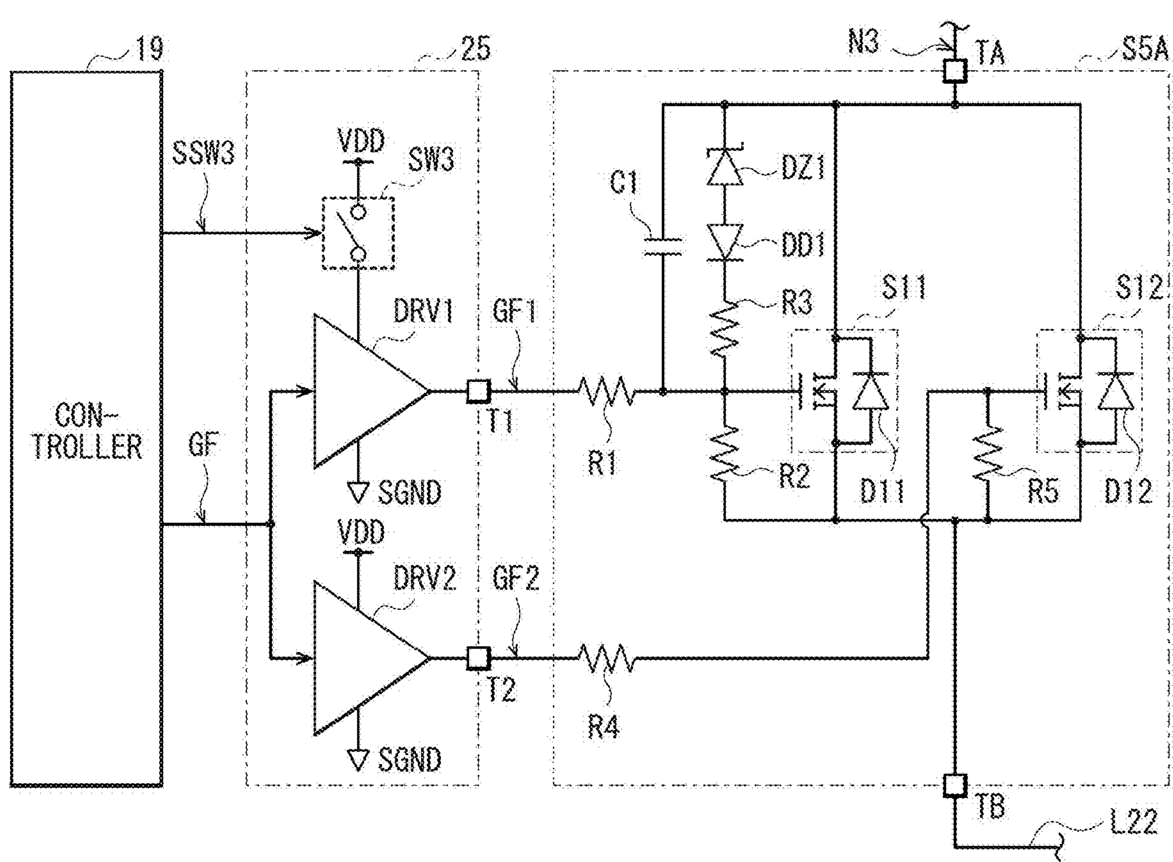

[ FIG. 9 ]
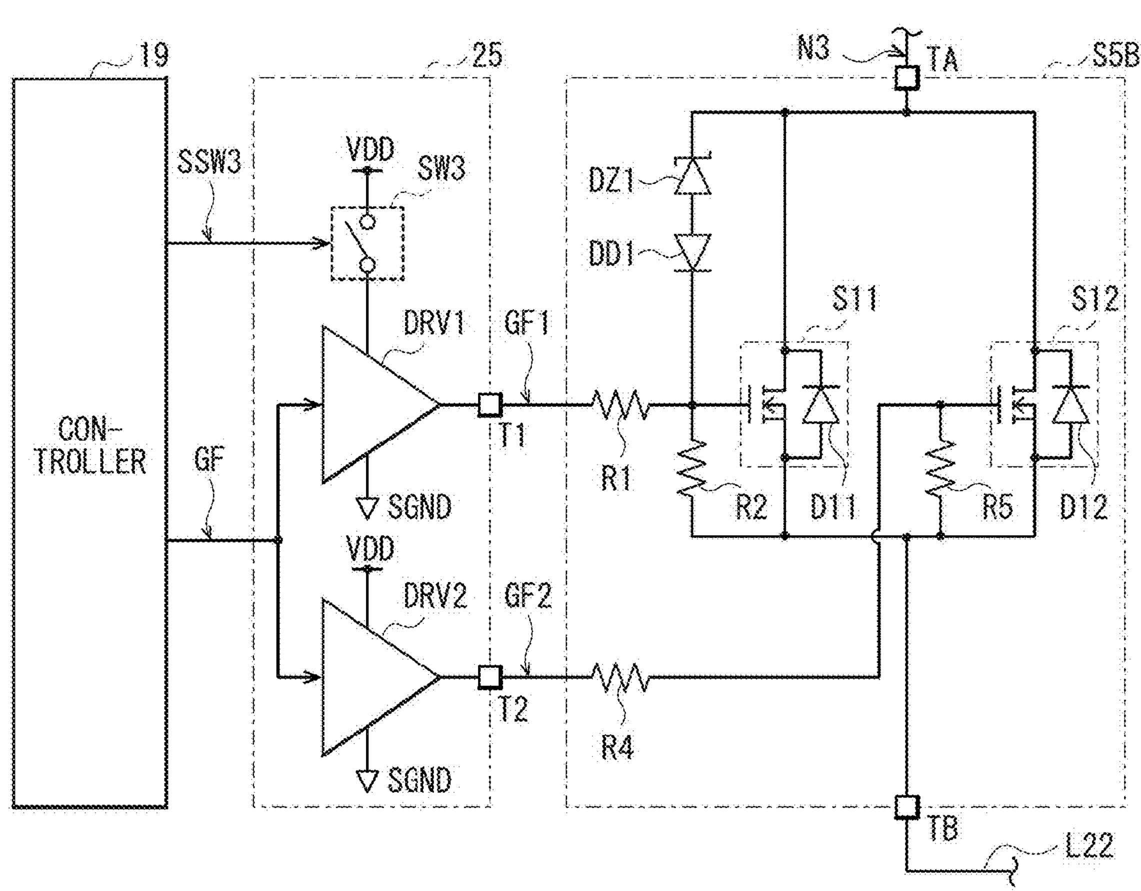

[ FIG. 10 ]
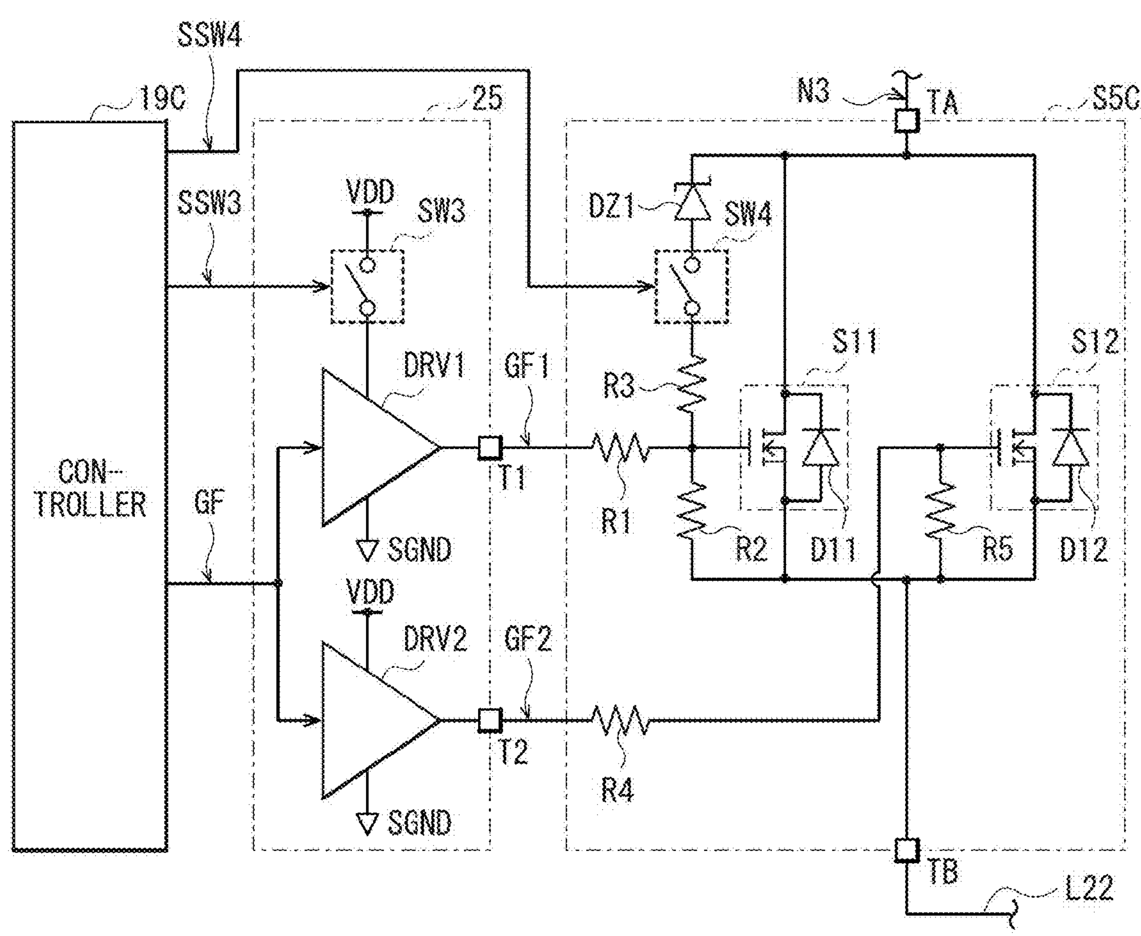

[ FIG. 11 ]
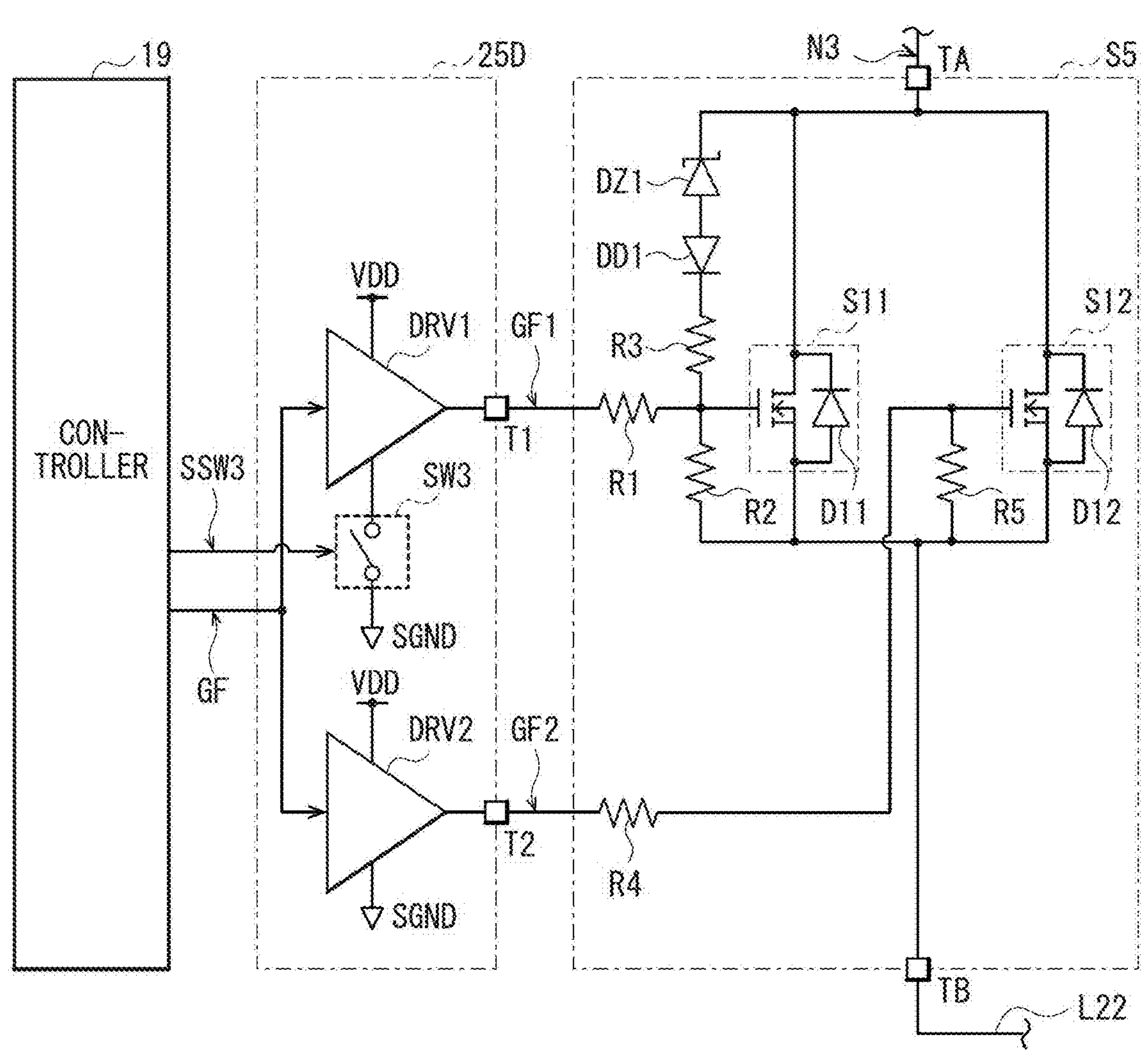

[ FIG. 12 ]
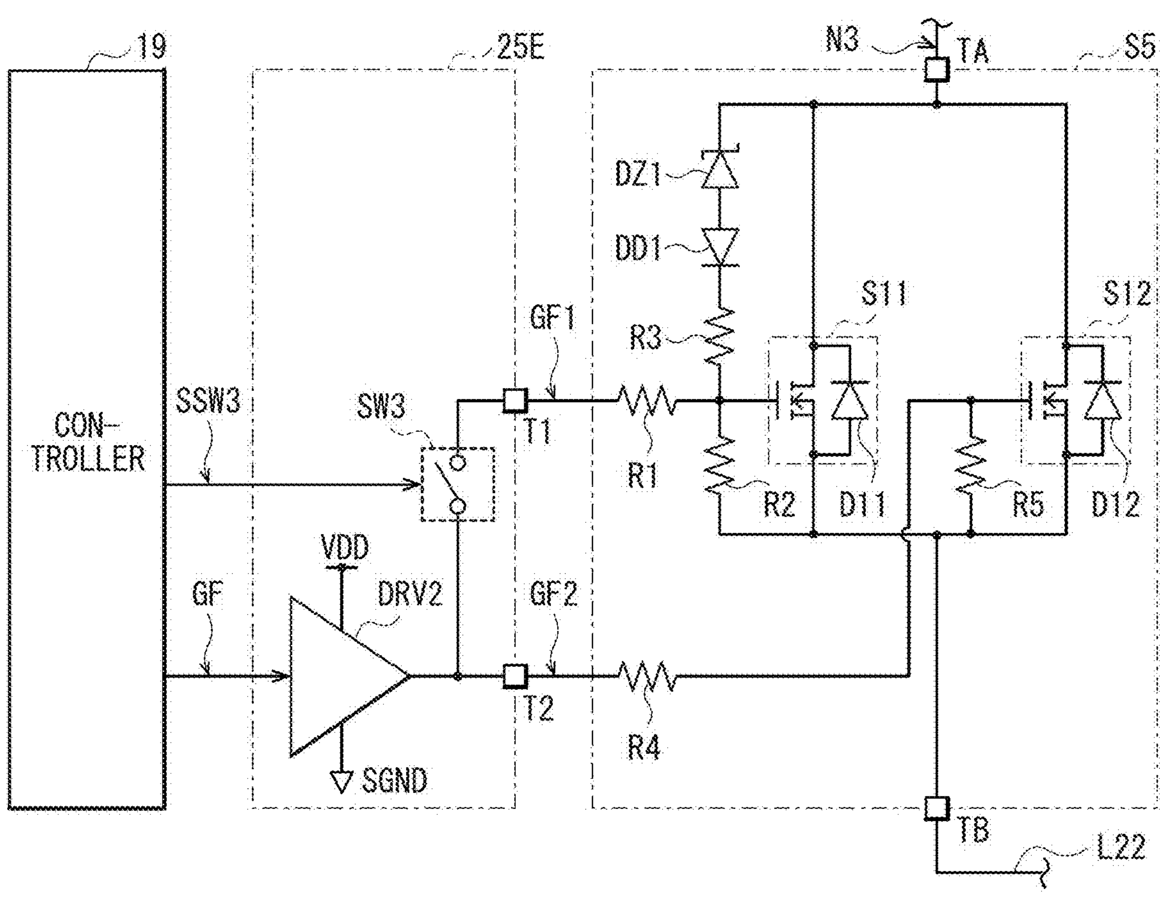

[ FIG. 13 ]
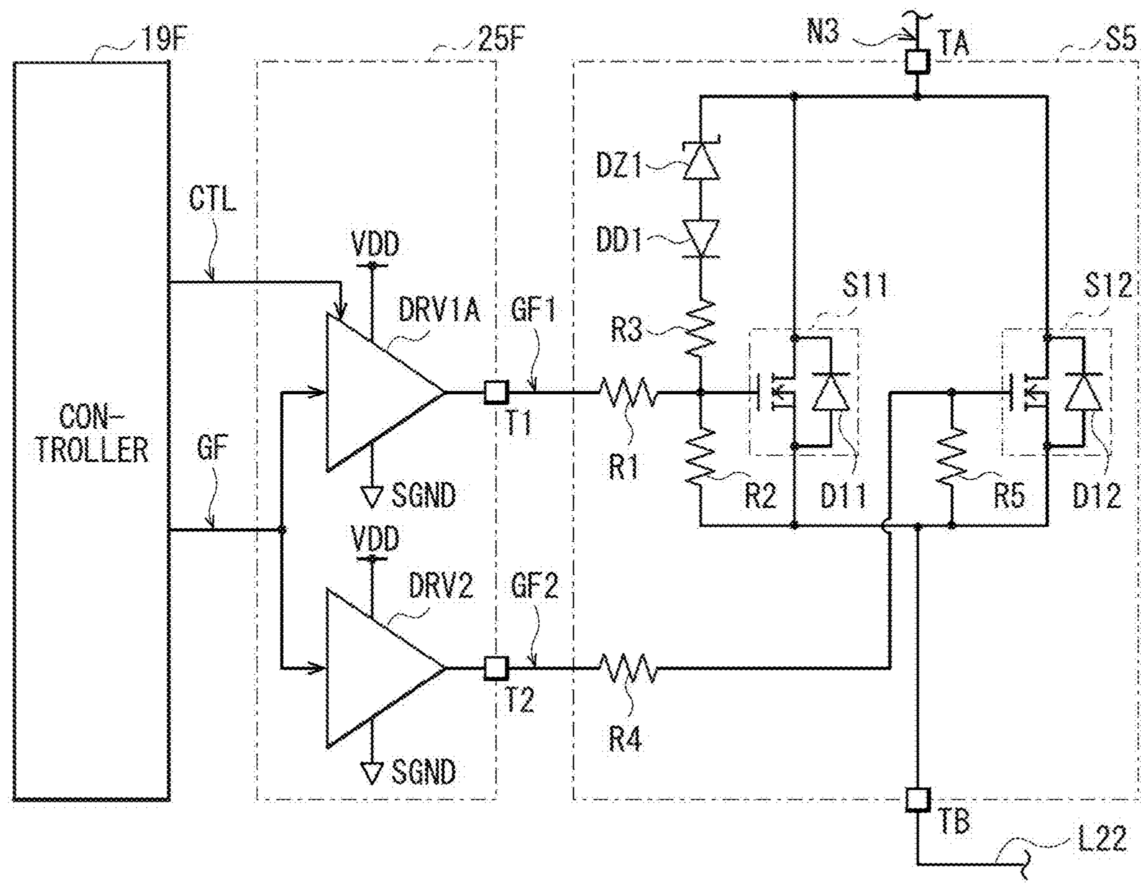
[ FIG. 14 ]
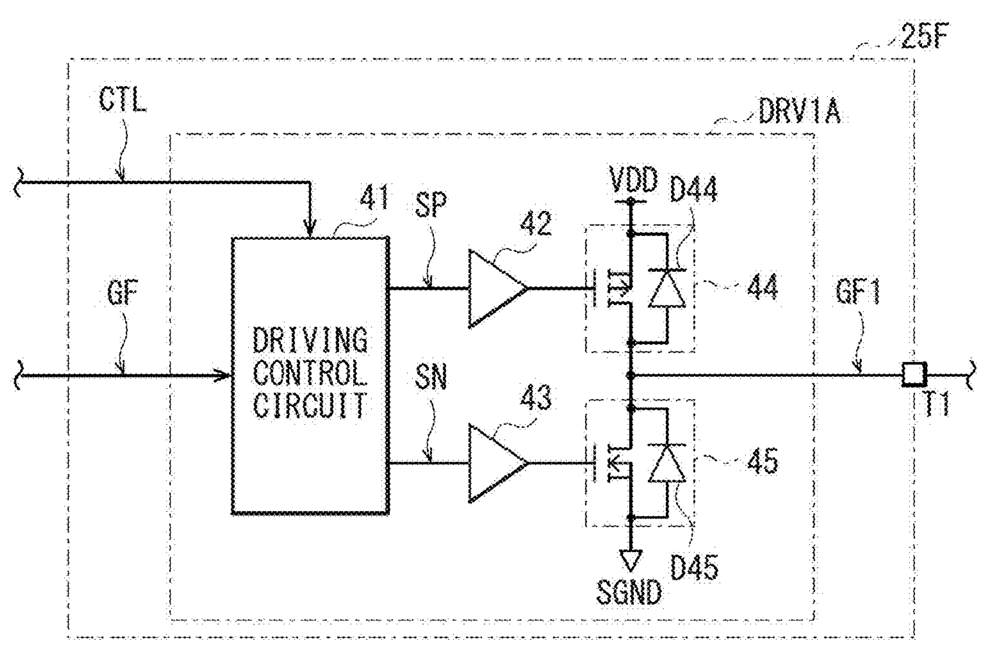

[ FIG. 15 ]
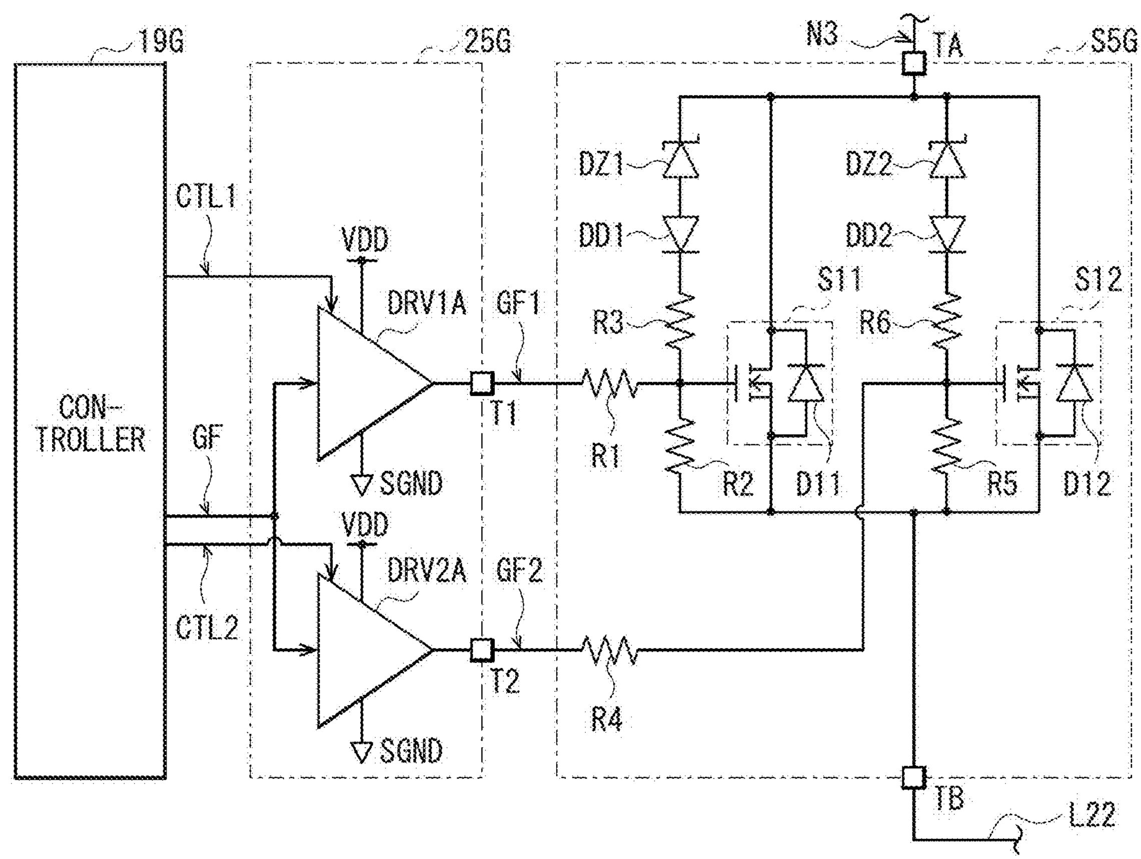
[ FIG. 16 ]
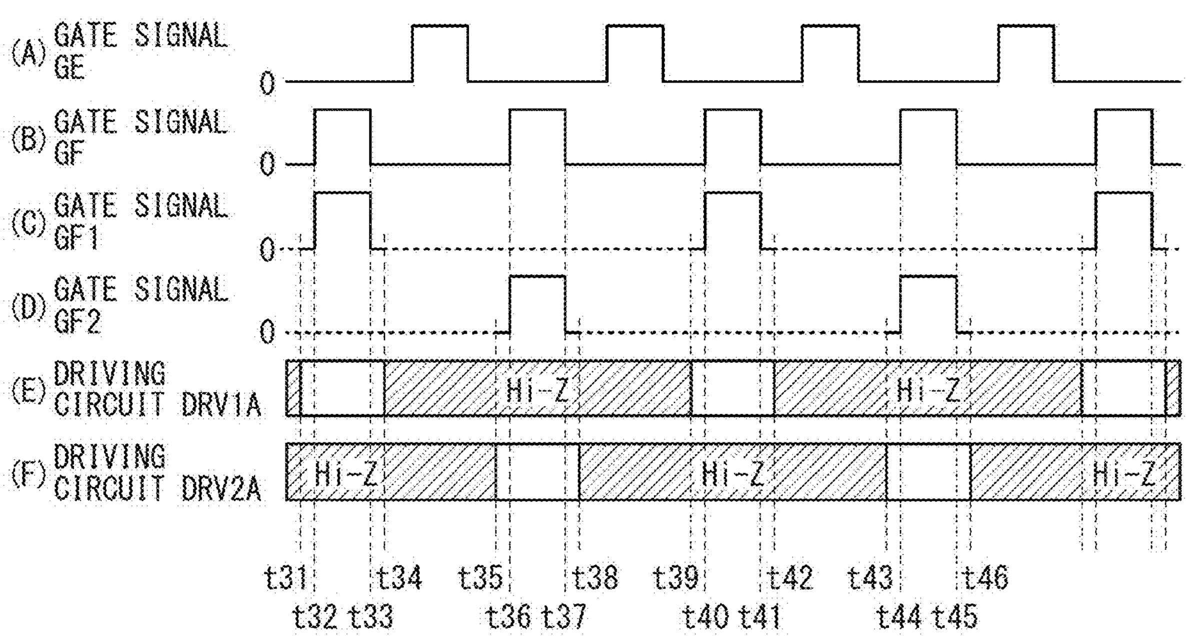

2
50
SW1
T11
L11
12
VDD
29
AUXILIARY POWER SUPPLY CIRCUIT
SGND
L21A
54
15
L21B
T21
GA1
S1
GC1
S3
GFH1
TA
S15
GEH1
S17
16
GFH2
TB
GEH2
D1
D3
53
11
VH
18
BH
N1
N6
BL
9
N2
N7
17
53A 53B
VL
GB1
S2
GD1
S4
GEL1
S16
GFL1
S18
SW2
GEL2
GFL2
D2
D4
T12
L12
GA1 ~ GD1
GEL2
GEH1
GEH2
GFH1
GFH2
GFL1
GFL2
L22
T22
21
56
57
55
58
DRIVER
GA ~ GD
SSW3
GE
GF
59
CONTROLLER

3
70
29
AUXILIARY POWER SUPPLY CIRCUIT
VDD
SGND
BL
T21
T22
18
V
VL
L21B
15
16
17
L22
79
S46
TA
TB
GF1
GF2
74
86
DRIVER
GF
S45
GE1
GE2
85
GE
L21A
SSW3
CONTROLLER
73
73A
73B
72
S7
D7
G71
81
G7
L11
L12
VH
11
T11
T12
SW1
SW2
BH
9

ELECTRIC POWER CONVERSION APPARATUS AND ELECTRIC POWER CONVERSION SYSTEM

TECHNICAL FIELD

The disclosure relates to an electric power conversion apparatus and an electric power conversion system that each convert electric power.

BACKGROUND ART

Some of electric power conversion apparatuses that convert electric power of a primary-side battery and supply the converted electric power to a secondary-side battery perform what is called a precharge operation before performing the electric power conversion operation. The precharge operation is an operation of supplying electric power of the secondary-side battery to a primary-side capacitor via the electric power conversion apparatus. For example, Patent Literature 1 discloses a technique of regenerating energy from a choke coil in secondary-side circuitry to primary-side circuitry in the precharge operation. For example, Patent Literature 2 discloses a technique of regenerating energy from a choke coil in secondary-side circuitry to the secondary-side circuitry in the precharge operation. For example, Patent Literature 3 discloses a technique of releasing energy of a reactor in primary-side circuitry by short-circuiting both ends of the reactor in the precharge operation.

CITATION LIST

Patent Literature

Patent Literature 1: Japanese Unexamined Patent Application Publication No. 2017-34982

Patent Literature 2: Japanese Unexamined Patent Application Publication No. 2018-61381

Patent Literature 3: Japanese Unexamined Patent Application Publication No. 2017-55589

SUMMARY

An electric power conversion apparatus according to an embodiment of the disclosure includes a first electric power terminal, a switcher, a transformer, a rectifier, a smoother, a second electric power terminal, a controller, and a driver. The switcher is coupled to the first electric power terminal and includes one or more switching devices. The transformer includes a first winding and a second winding. The first winding is coupled to the switcher. The rectifier is coupled to the second winding and includes a switching circuit that includes a first switching device and a second switching device. The first switching device is operable based on a first control signal. The second switching device is operable based on a second control signal. The smoother is coupled to the rectifier and includes an inductor. The second electric power terminal is coupled to the smoother. The controller is configured to control operations of the switcher and the rectifier. The driver is configured to drive the switching circuit, based on an instruction from the controller. The first switching device and the second switching device each include a first terminal, a second terminal, and a control terminal. The switching circuit further includes a first device provided on a first path and configured to clamp a voltage. The first path couples the first terminal of the first switching device and the control terminal of the first switching device to each other. The driver includes a first output terminal and a second output terminal, and is configured to, based on a signal supplied from the controller, output the first control signal from the first output terminal and output the second control signal from the second output terminal. The controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

An electric power conversion system according to an embodiment of the disclosure includes a first battery, a second capacitor, a first switch, a second switch, an electric power conversion apparatus, and a second battery. The first battery includes a first terminal and a second terminal. The second capacitor includes a first terminal and a second terminal. The first switch is provided on a path coupling the first terminal of the first battery and the first terminal of the second capacitor to each other. The second switch is provided on a path coupling the second terminal of the first battery and the second terminal of the second capacitor to each other. The electric power conversion apparatus includes a first electric power terminal, a switcher, a transformer, a rectifier, a smoother, a second electric power terminal, a controller, and a driver. The first electric power terminal includes a first coupling terminal coupled to the first terminal of the second capacitor, and a second coupling terminal coupled to the second terminal of the second capacitor. The switcher is coupled to the first electric power terminal and includes one or more switching devices. The transformer includes a first winding and a second winding. The first winding is coupled to the switcher. The rectifier is coupled to the second winding and includes a switching circuit that includes a first switching device and a second switching device. The first switching device is operable based on a first control signal. The second switching device is operable based on a second control signal. The smoother is coupled to the rectifier and includes an inductor. The second electric power terminal is coupled to the smoother and to the second battery. The controller is configured to control operations of the switcher and the rectifier. The driver is configured to drive the switching circuit, based on an instruction from the controller. The first switching device and the second switching device each include a first terminal, a second terminal, and a control terminal. The switching circuit further includes a first device provided on a first path and configured to clamp a voltage. The first path couples the first terminal of the first switching device and the control terminal of the first switching device to each other. The driver includes a first output terminal and a second output terminal, and is configured to, based on a signal supplied from the controller, output the first control signal from the first output terminal and output the second control signal from the second output terminal. The controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

BRIEF DESCRIPTION OF DRAWINGS

FIG. 2 is a circuit diagram illustrating a configuration example of a driver and a switching circuit illustrated in FIG. 1.

FIG. 3 is a block diagram illustrating a configuration example of a controller illustrated in FIG. 1.

FIG. 4 is a timing waveform diagram illustrating an operation example of the electric power conversion system illustrated in FIG. 1.

FIG. 5 is another timing waveform diagram illustrating an operation example of the electric power conversion system illustrated in FIG. 1.

FIG. 6 is a circuit diagram illustrating a configuration example of a driver and a switching circuit according to a comparative example.

FIG. 7 is a circuit diagram illustrating a configuration example of a driver and a switching circuit according to another comparative example.

FIG. 8 is a circuit diagram illustrating a configuration example of a switching circuit according to a modification example.

FIG. 9 is a circuit diagram illustrating a configuration example of a switching circuit according to another modification example.

FIG. 10 is a circuit diagram illustrating a configuration example of a switching circuit according to another modification example.

FIG. 11 is a circuit diagram illustrating a configuration example of a driver according to another modification example.

FIG. 12 is a circuit diagram illustrating a configuration example of a driver according to another modification example.

FIG. 13 is a circuit diagram illustrating a configuration example of a driver according to another modification example.

FIG. 14 is a circuit diagram illustrating a configuration example of a driving circuit illustrated in FIG. 13.

FIG. 15 is a circuit diagram illustrating a configuration example of a driver and a switching circuit according to another modification example.

FIG. 16 is a timing waveform diagram illustrating an operation example of the driver and the switching circuit illustrated in FIG. 15.

DETAILED DESCRIPTION

In an electric power conversion apparatus, an excessive voltage can sometimes be applied to a switching device by energy of an inductor. It is therefore desired to prevent an excessive voltage from being applied to the switching device.

It is desirable to provide an electric power conversion apparatus and an electric power conversion system that each make it possible to prevent an excessive voltage from being applied to a switching device.

Some example embodiments of the disclosure will be described in detail below with reference to the drawings.

Example Embodiment

Configuration Example

Figure 1:
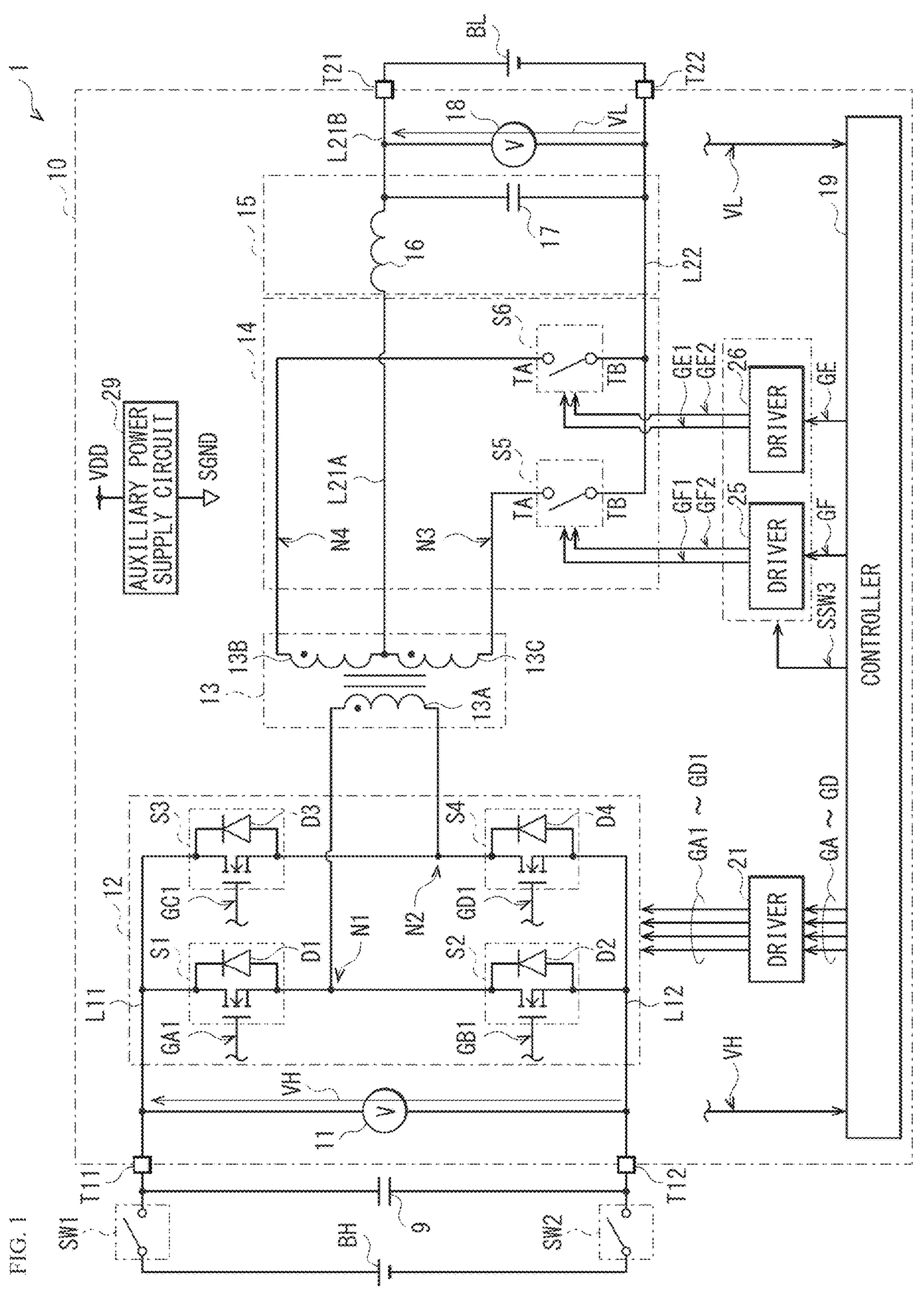
FIG. 1 is a circuit diagram illustrating a configuration example of an electric power conversion system according to one example embodiment of the disclosure.

FIG. 1 illustrates a configuration example of an electric power conversion system 1 including an electric power conversion apparatus according to an example embodiment of the disclosure. The electric power conversion system 1 includes a high voltage battery BH, switches SW1 and SW2, a capacitor 9, an electric power conversion apparatus 10, and a low voltage battery BL. The electric power conversion system 1 is configured to convert electric power supplied from the high voltage battery BH and to supply the converted electric power to the low voltage battery BL.

The high voltage battery BH is configured to store electric power. The high voltage battery BH supplies the electric power to the electric power conversion apparatus 10 via the switches SW1 and SW2.

The switches SW1 and SW2 are configured to supply the electric power stored in the high voltage battery BH to the electric power conversion apparatus 10 by being turned on. The switches SW1 and SW2 each include a relay, for example. The switch SW1 couples a positive terminal of the high voltage battery BH and a terminal T11 of the electric power conversion apparatus 10 to each other by being turned on. The switch SW2 couples a negative terminal of the high voltage battery BH and a terminal T12 of the electric power conversion apparatus 10 to each other by being turned on. The switches SW1 and SW2 are turned on and off in accordance with instructions from an unillustrated system controller.

The capacitor 9 has one end coupled to the terminal T11 of the electric power conversion apparatus 10 and to the switch SW1, and another end coupled to the terminal T12 of the electric power conversion apparatus 10 and to the switch SW2.

The electric power conversion apparatus 10 is configured to convert the electric power by stepping down a voltage supplied from the high voltage battery BH, and to supply the converted electric power to the low voltage battery BL. The electric power conversion apparatus 10 is what is called a center-tapped electric power conversion apparatus. The electric power conversion apparatus 10 includes the terminals T11 and T12, a voltage sensor 11, a switcher 12, a driver 21, a transformer 13, a rectifier 14, drivers 25 and 26, an auxiliary power supply circuit 29, a smoother 15, a voltage sensor 18, a controller 19, and terminals T21 and T22. The high voltage battery BH, the switches SW1 and SW2, the capacitor 9, the voltage sensor 11, the switcher 12, and the driver 21 configure primary-side circuitry of the electric power conversion system 1. The rectifier 14, the drivers 25 and 26, the smoother 15, the voltage sensor 18, and the low voltage battery BL configure secondary-side circuitry of the electric power conversion system 1.

The terminals T11 and T12 are configured to be supplied with a voltage from the high voltage battery BH upon turning-on of the switches SW1 and SW2. In the electric power conversion apparatus 10, the terminal T11 is coupled to a voltage line L11, and the terminal T12 is coupled to a reference voltage line L12.

The voltage sensor 11 is configured to detect a voltage at the voltage line L11. The voltage sensor 11 has one end coupled to the voltage line L11, and another end coupled to the reference voltage line L12. The voltage sensor 11 detects, as a voltage VH, the voltage at the voltage line L11 with respect to a voltage at the reference voltage line L12. Further, the voltage sensor 11 supplies a result of detection of the voltage VH to the controller 19.

The switcher 12 is configured to convert a direct-current voltage supplied from the high voltage battery BH into an alternating-current voltage. The switcher 12 is a full-bridge circuit, and includes transistors S1 to S4. The transistors S1 to S4 are switching devices that perform switching operations, respectively based on gate signals GA1 to GD1. The transistors S1 to S4 each include an N-type field-effect transistor (FET), for example. The transistors S1 to S4 include body diodes D1 to D4, respectively. For example, the body diode D1 has an anode coupled to a source of the transistor S1, and a cathode coupled to a drain of the transistor S1. This similarly applies to the body diodes D2 to D4. Note that although the N-type field-effect transistor is used in this example, any kind of switching device may be used.

The transistor S1 is provided on a path coupling the voltage line L11 and a node N1 to each other, and is configured to couple the node N1 to the voltage line L11 by being turned on. The transistor S1 has the drain coupled to the voltage line L11, a gate to be supplied with the gate signal GA1, and the source coupled to the node N1. The transistor S2 is provided on a path coupling the node N1 and the reference voltage line L12 to each other, and is configured to couple the node N1 to the reference voltage line L12 by being turned on. The transistor S2 has a drain coupled to the node N1, a gate to be supplied with the gate signal GB1, and a source coupled to the reference voltage line L12. The node N1 is a coupling point between the source of the transistor S1 and the drain of the transistor S2.

The transistor S3 is provided on a path coupling the voltage line L11 and a node N2 to each other, and is configured to couple the node N2 to the voltage line L11 by being turned on. The transistor S3 has a drain coupled to the voltage line L11, a gate to be supplied with the gate signal GC1, and a source coupled to the node N2. The transistor S4 is provided on a path coupling the node N2 and the reference voltage line L12 to each other, and is configured to couple the node N2 to the reference voltage line L12 by being turned on. The transistor S4 has a drain coupled to the node N2, a gate to be supplied with the gate signal GD1, and a source coupled to the reference voltage line L12. The node N2 is a coupling point between the source of the transistor S3 and the drain of the transistor S4.

The driver 21 is configured to drive the transistors S1 to S4, respectively based on gate signals GA to GD supplied from the controller 19. Specifically, the driver 21 generates the gate signal GA1, based on the gate signal GA, and drives the transistor S1 through the use of the gate signal GA1. The driver 21 generates the gate signal GB1, based on the gate signal GB, and drives the transistor S2 through the use of the gate signal GB1. The driver 21 generates the gate signal GC1, based on the gate signal GC, and drives the transistor S3 through the use of the gate signal GC1. The driver 21 generates the gate signal GD1, based on the gate signal GD, and drives the transistor S4 through the use of the gate signal GD1.

The transformer 13 is configured to provide direct-current isolation and alternating-current coupling between the primary-side circuitry and the secondary-side circuitry, and to convert an alternating-current voltage supplied from the primary-side circuitry with a transformation ratio N of the transformer 13 to thereby supply the converted alternating-current voltage to the secondary-side circuitry. The transformer 13 includes windings 13A, 13B, and 13C. The winding 13A has one end coupled to the node N1 in the switcher 12, and another end coupled to the node N2 in the switcher 12. The winding 13B has one end coupled to a node N4 in the rectifier 14, and another end coupled to one end of the winding 13C and to a voltage line L21A. The winding 13C has the one end coupled to the other end of the winding 13B and to the voltage line L21A, and another end coupled to a node N3 in the rectifier 14.

The rectifier 14 is configured to rectify the alternating-current voltage outputted from the windings 13B and 13C of the transformer 13 to thereby generate an output voltage. The rectifier 14 includes switching circuits S5 and S6.

The switching circuit S5 is provided on a path coupling the node N3 and a reference voltage line L22 to each other, and is configured to couple the node N3 to the reference voltage line L22 by being turned on. The switching circuit S5 has a terminal TA coupled to the node N3, and a terminal TB coupled to the reference voltage line L22. The switching circuit S5 has a control terminal to be supplied with gate signals GF1 and GF2.

The switching circuit S6 is provided on a path coupling the node N4 and the reference voltage line L22 to each other, and is configured to couple the node N4 to the reference voltage line L22 by being turned on. The switching circuit S6 has a terminal TA coupled to the node N4, and a terminal TB coupled to the reference voltage line L22. The switching circuit S6 has a control terminal to be supplied with gate signals GE1 and GE2.

The driver 25 is configured to drive the switching circuit S5, based on a gate signal GF and a control signal SSW3 that are supplied from the controller 19. Specifically, the driver 25 generates the gate signals GF1 and GF2, based on the gate signal GF, and drives the switching circuit S5 through the use of the gate signals GF1 and GF2. Further, the driver 25 is configured to, based on the control signal SSW3, cause an output impedance of an output terminal (an output terminal T1 to be described later) outputting the gate signal GF1 to be in a high impedance state.

The driver 26 is configured to drive the switching circuit S6, based on a gate signal GE and the control signal SSW3 that are supplied from the controller 19. Specifically, the driver 26 generates the gate signals GE1 and GE2, based on the gate signal GE, and drives the switching circuit S6 through the use of the gate signals GE1 and GE2. Further, the driver 26 is configured to, based on the control signal SSW3, cause an output impedance of an output terminal (an output terminal T1 to be described later) outputting the gate signal GE1 to be in the high impedance state.

The auxiliary power supply circuit 29 is configured to generate a power supply voltage VDD to be supplied to the controller 19 and the drivers 21, 25, and 26. The auxiliary power supply circuit 29 is coupled to a power supply node of the power supply voltage VDD and a reference power supply node of a power supply voltage SGND. A power supply node of the power supply voltage SGND is coupled to the reference voltage line L22, for example. The auxiliary power supply circuit 29 generates the power supply voltage VDD, based on, for example, electric power supplied from the high voltage battery BH or electric power supplied from the low voltage battery BL. Although the auxiliary power supply circuit 29 supplies the power supply voltage VDD to the controller 19 and the drivers 21, 25, and 26 in this example, this is non-limiting. For example, the auxiliary power supply circuit 29 may generate another power supply voltage lower than the power supply voltage VDD, in addition to the power supply voltage VDD, and may supply the other power supply voltage to the controller 19.

FIG. 2 illustrates a configuration example of the driver 25 and the switching circuit S5. Note that this applies also to the driver 26 and the switching circuit S6.

The driver 25 incudes a switch SW3, driving circuits DRV1 and DRV2, and output terminals T1 and T2.

The switch SW3 is configured to supply power to the driving circuit DRV1, based on the control signal SSW3 supplied from the controller 19. The switch SW3 includes a field-effect transistor, for example. The switch SW3 has one end coupled to the power supply node of the power supply voltage VDD, and another end coupled to a power supply terminal of the driving circuit DRV1.

The driving circuit DRV1 is configured to generate the gate signal GF1, based on the gate signal GF supplied from the controller 19, and to drive a transistor S11 (described later) of the switching circuit S5 through the use of the gate signal GF1. The driving circuit DRV1 has an output terminal coupled to the output terminal T1 of the driver 25, the power supply terminal coupled to the other end of the switch SW3, and a reference power supply terminal coupled to the power supply node of the power supply voltage SGND.

The driving circuit DRV2 is configured to generate the gate signal GF2, based on the gate signal GF supplied from the controller 19, and to drive a transistor S12 (described later) of the switching circuit S5 through the use of the gate signal GF2. The driving circuit DRV2 has an output terminal coupled to the output terminal T2 of the driver 25, a power supply terminal coupled to the power supply node of the power supply voltage VDD, and a reference power supply terminal coupled to the power supply node of the power supply voltage SGND.

The output terminal T1 is a terminal outputting the gate signal GF1, and the output terminal T2 is a terminal outputting the gate signal GF2.

With this configuration, when the switch SW3 is on, the driver 25 generates the gate signals GF1 and GF2, based on the gate signal GF, and drives the switching circuit S5 through the use of the gate signals GF1 and GF2. Further, when the switch SW3 is off, the driver 25 generates the gate signal GF2, based on the gate signal GF, and drives the switching circuit S5 through the use of the gate signal GF2. Because the SW3 is off, no power supply voltage is supplied to the driving circuit DRV1. As a result, the output impedance of the output terminal T1 of the driver 25 is set to the high impedance state.

The switching circuit S5 includes resistors R1 and R2, a Zener diode DZ1, a diode DD1, a resistor R3, the transistor S11, resistors R4 and R5, and the transistor S12.

The resistor R1 has one end coupled to the output terminal T1 of the driver 25, and another end coupled to a gate of the transistor S11. The resistor R2 has one end coupled to the gate of the transistor S11, and another end coupled to the terminal TB of the switching circuit S5. The Zener diode DZ1 has a cathode coupled to the terminal TA of the switching circuit S5, and an anode coupled to an anode of the diode DD1. The diode DD1 has the anode coupled to the anode of the Zener diode DZ1, and a cathode coupled to the resistor R3. The resistor R3 has one end coupled to the cathode of the diode DD1, and another end coupled to the gate of the transistor S11. The transistor S11 includes an N-type field-effect transistor, for example. As with the transistors S1 to S4, the transistor S11 includes a body diode D11. The transistor S11 has the gate coupled to the resistors R1 to R3, a drain coupled to the terminal TA of the switching circuit S5, and a source coupled to the terminal TB of the switching circuit S5.

The resistor R4 has one end coupled to the output terminal T2 of the driver 25, and another end coupled to a gate of the transistor S12. The resistor R5 has one end coupled to the gate of the transistor S12, and another end coupled to the terminal TB of the switching circuit S5. The transistor S12 includes an N-type field-effect transistor, for example. As with the transistors S1 to S4, the transistor S12 includes a body diode D12. The transistor S12 has the gate coupled to the resistors R4 and R5, a drain coupled to the terminal TA of the switching circuit S5, and a source coupled to the terminal TB of the switching circuit S5.

In this way, in the switching circuit S5, the drain of the transistor S11 and the drain of the transistor S12 are coupled to each other, and the source of the transistor S11 and the source of the transistor S12 are coupled to each other. The transistor S11 operates based on the gate signal GF1, and the transistor S12 operates based on the gate signal GF2.

The smoother 15 (FIG. 1) is configured to smooth the output voltage of the rectifier 14. The smoother 15 includes a choke inductor 16 and a capacitor 17. The choke inductor 16 has one end coupled to the voltage line L21A, and another end coupled to a voltage line L21B. The capacitor 17 has one end coupled to the voltage line L21B, and another end coupled to the reference voltage line L22. Note that although the choke inductor 16 is provided on the voltage lines L21A and L21B in this example, this is non-limiting. Alternatively, the choke inductor 16 may be provided on the reference voltage line L22, for example.

The voltage sensor 18 is configured to detect a voltage at the voltage line L21B. The voltage sensor 18 has one end coupled to the voltage line L21B, and another end coupled to the reference voltage line L22. The voltage sensor 18 detects, as a voltage VL, the voltage at the voltage line L21B with respect to a voltage at the reference voltage line L22. Further, the voltage sensor 18 supplies a result of detection of the voltage VL to the controller 19.

The controller 19 is configured to control an operation of the electric power conversion apparatus 10 by controlling operations of the switcher 12 and the rectifier 14, based on the voltage VH detected by the voltage sensor 11 and the voltage VL detected by the voltage sensor 18. Specifically, the controller 19 generates the gate signals GA to GF, based on the voltages VH and VL, and controls the operation of the electric power conversion apparatus 10 by performing pulse width modulation (PWM) control through the use of the gate signals GA to GF. Further, the controller 19 generates the control signal SSW3 and controls operations of the drivers 25 and 26 through the use of the control signal SSW3.

The terminals T21 and T22 are configured to supply a voltage generated by the electric power conversion apparatus 10 to the low voltage battery BL. In the electric power conversion apparatus 10, the terminal T21 is coupled to the voltage line L21B, and the terminal T22 is coupled to the reference voltage line L22. Further, the terminal T21 is coupled to a positive terminal of the low voltage battery BL, and the terminal T22 is coupled to a negative terminal of the low voltage battery BL.

The low voltage battery BL is configured to store the electric power supplied from the electric power conversion apparatus 10.

With this configuration, the electric power conversion system 1 performs, in a period in which the switches SW1 and SW2 are on, an electric power conversion operation of converting electric power supplied from the high voltage battery BH and supplying the converted electric power to the low voltage battery BL.

Further, the electric power conversion system 1 also has a function of performing what is called a precharge operation, that is, an operation of charging the capacitor 9 in a preparation period (a precharge period P1) before the above-described electric power conversion operation is started. In the precharge operation, the switches SW1 and SW2 are off, and the controller 19 controls the operations of the switcher 12 and the rectifier 14 to thereby cause the electric power conversion system 1 to supply the electric power of the low voltage battery BL to the capacitor 9. This makes it possible for the electric power conversion apparatus 10 to reduce an inrush current flowing from the high voltage battery BH to the capacitor 9 when the switches SW1 and SW2 are turned on to perform the electric power conversion operation.

FIG. 3 illustrates a configuration example of the controller 19. The controller 19 includes a precharge controller 31, an electric power conversion controller 32, gate signal generators 33 and 34, and a switch controller 35.

The precharge controller 31 is configured to generate, in the precharge period P1, a duty ratio DP of the switching operation of the switcher 12 and a duty ratio DS of the switching operation of the rectifier 14, based on the voltages VH and VL.

Specifically, the precharge controller 31 generates the duty ratio DP of the switcher 12, based on the voltage VL, in the precharge period P1. The precharge controller 31 so generates the duty ratio DP that the higher the voltage VL is, the lower the duty ratio DP is. The precharge controller 31 generates the duty ratio DP to cause the duty ratio DP to gradually increase in a period until the voltage VH reaches a target voltage. This makes it possible to reduce a current stress in circuitry in the electric power conversion system 1.

Further, in the precharge period P1, the precharge controller 31 generates the duty ratio DS of the rectifier 14, based on the voltage VL. The precharge controller 31 so generates the duty ratio DS that the higher the voltage VL is, the lower the duty ratio DS is. The precharge controller 31 generates the duty ratio DS to cause the duty ratio DS to gradually increase in a period until the voltage VH reaches a target voltage. This makes it possible to reduce a current stress in circuitry in the electric power conversion system 1.

The electric power conversion controller 32 is configured to generate the duty ratio DP of the switching operation of the switcher 12 and the duty ratio DS of the switching operation of the rectifier 14, based on the voltages VH and VL, in a period (an electric power conversion period P2) in which the electric power conversion operation is performed.

The gate signal generator 33 is configured to generate the gate signals GA to GD, based on the duty ratios DP generated by the precharge controller 31 and the electric power conversion controller 32. Specifically, in the precharge period P1, the gate signal generator 33 generates the gate signals GC and GD, based on the duty ratio DP generated by the precharge controller 31, and maintains the gate signals GA and GB at a low level. Further, in the electric power conversion period P2, the gate signal generator 33 generates the gate signals GA to GD, based on the duty ratio DP generated by the electric power conversion controller 32.

The gate signal generator 34 is configured to generate the gate signals GE and GF, based on data on the duty ratios DS supplied from the precharge controller 31 and the electric power conversion controller 32. Specifically, in the precharge period P1, the gate signal generator 34 generates the gate signals GE and GF, based on the duty ratio DS generated by the precharge controller 31. Further, in the electric power conversion period P2, the gate signal generator 34 generates the gate signals GE and GF, based on the duty ratio DS generated by the electric power conversion controller 32.

The switch controller 35 is configured to generate the control signal SSW3 and to control operations of the switches SW3 of the drivers 25 and 26 through the use of the control signal SSW3. Specifically, the switch controller 35 causes the switch SW3 of each of the drivers 25 and 26 to be off in the precharge period P1, and causes the switch SW3 of each of the drivers 25 and 26 to be on in the electric power conversion period P2.

Here, the terminals T11 and T12 correspond to a specific but non-limiting example of a "first electric power terminal" in one embodiment of the disclosure. The switcher 12 corresponds to a specific but non-limiting example of a "switcher" in one embodiment of the disclosure. The transformer 13 corresponds to a specific but non-limiting example of a "transformer" in one embodiment of the disclosure. The winding 13A corresponds to a specific but non-limiting example of a "first winding" in one embodiment of the disclosure. The windings 13B and 13C correspond to a specific but non-limiting example of a "second winding" in one embodiment of the disclosure. The rectifier 14 corresponds to a specific but non-limiting example of a "rectifier" in one embodiment of the disclosure. For example, the switching circuit S5 corresponds to a specific but non-limiting example of a "switching circuit" in one embodiment of the disclosure. The transistor S11 corresponds to a specific but non-limiting example of a "first switching device" in one embodiment of the disclosure. The transistor S12 corresponds to a specific but non-limiting example of a "second switching device" in one embodiment of the disclosure. The Zener diode DZ1 corresponds to a specific but non-limiting example of a "first device" in one embodiment of the disclosure. The diode DD1 corresponds to a specific but non-limiting example of a "second device" in one embodiment of the disclosure. The smoother 15 here corresponds to a specific but non-limiting example of a "smoother" in one embodiment of the disclosure. The terminals T21 and T22 correspond to a specific but non-limiting example of a "second electric power terminal" in one embodiment of the disclosure. The controller 19 corresponds to a specific but non-limiting example of a "controller" in one embodiment of the disclosure. For example, the driver 25 corresponds to a specific but non-limiting example of a "driver" in one embodiment of the disclosure. The output terminal T1 corresponds to a specific but non-limiting example of a "first output terminal" in one embodiment of the disclosure. The output terminal T2 corresponds to a specific but non-limiting example of a "second output terminal" in one embodiment of the disclosure. The gate signal GF1 corresponds to a specific but non-limiting example of a "first control signal" in one embodiment of the disclosure.

The gate signal GF2 corresponds to a specific but non-limiting example of a "second control signal" in one embodiment of the disclosure. The driving circuit DRV1 corresponds to a specific but non-limiting example of a "driving circuit" in one embodiment of the disclosure. The switch SW3 corresponds to a specific but non-limiting example of a "switch" in one embodiment of the disclosure. The precharge period P1 corresponds to a specific but non-limiting example of a "predetermined period" in one embodiment of the disclosure. The capacitor 9 corresponds to a specific but non-limiting example of a "second capacitor" in one embodiment of the disclosure.

Operation and Workings

Next, a description will be given of operation and workings of the electric power conversion system 1 of the present example embodiment.

Outline of Overall Operation

First, an outline of an overall operation of the electric power conversion system 1 will be described with reference to FIG. 1. In the precharge period P1, the switches SW1 and SW2 are off, and the controller 19 generates the gate signals GC to GF, based on the voltages VH and VL, and maintains the gate signals GA and GB at the low level. This causes the switcher 12 and the rectifier 14 to operate, and causes the electric power conversion apparatus 10 to supply electric power of the low voltage battery BL to the capacitor 9. As a result, the capacitor 9 is charged and the voltage VH rises. When the voltage VH reaches, for example, a target voltage, the precharge operation ends and the switches SW1 and SW2 are turned on. In the electric power conversion period P2, the controller 19 generates the gate signals GA to GF, based on the voltages VH and VL. This causes the electric power conversion apparatus 10 to convert electric power supplied from the high voltage battery BH and to supply the converted electric power to the low voltage battery BL.

Detailed Operation

In the preparation period (the precharge period P1) before the electric power conversion operation is started, the switch controller 35 of the controller 19 causes the switch SW3 of each of the drivers 25 and 26 to be off, through the use of the control signal SSW3. The precharge controller 31 of the controller 19 generates the duty ratios DP and DS to cause the duty ratios DP and DS to gradually increase. Thereafter, the gate signal generator 33 generates the gate signals GC and GD, based on the duty ratio DP generated by the precharge controller 31, and maintains the gate signals GA and GB at the low level. The driver 21 generates the gate signals GA1 to GD1, based on the gate signals GA to GD, respectively, and the switcher 12 performs the switching operation, based on the gate signals GA1 to GD1. The gate signal generator 34 generates the gate signals GE and GF, based on the duty ratio DS generated by the precharge controller 31. The driver 25 generates the gate signal GF2, based on the gate signal GF, and the driver 26 generates the gate signal GE2, based on the gate signal GE. In the precharge period P1, the switch SW3 is off in each of the drivers 25 and 26, and accordingly, the output impedance of the output terminal T1 of the driver 25 and the output impedance of the output terminal T1 of the driver 26 are set to the high impedance state. The rectifier 14 performs the switching operation, based on the gate signals GE2 and GF2. As a result, the voltage VH at the capacitor 9 gradually rises in the precharge period P1.

FIG. 4 illustrates a simulation waveform example of the precharge operation. In FIG. 4, part (A) illustrates a waveform of each of the gate signals GE and GF, part (B) illustrates a waveform of each of the gate signals GC and GD, part (C) illustrates a current (a charge current ICHG) flowing into the capacitor 9, part (D) illustrates a waveform of a current (an inductor current IL) flowing through the choke inductor 16 from the voltage line L21B to the voltage line L21A, part (E) illustrates a waveform of a voltage (a transformer voltage VTR1) of the winding 13A of the transformer 13 at the node N1 with respect to that at the node N2, part (F) illustrates a voltage between the drain and the source (a drain-source voltage VDSF) of each of the transistors S11 and S12 in the switching circuit S5, and part (G) illustrates a waveform of the voltage VH. In FIG. 4, T represents a period of the switching operation.

In the precharge operation, the controller 19 generates the gate signals GC and GD, based on the duty ratio DP, and generates the gate signals GE and GF, based on the duty ratio DS. The duty ratio DP represents a pulse width of each of the gate signals GC and GD when a period T (a duration from a timing t11 to a timing t13) is assumed to be "1", and the duty ratio DS represents a pulse width of each of the gate signals GE and G when the period T is assumed to be "1". As illustrated in parts (A) and (B) of FIG. 4, the controller 19 changes the gate signals GC and GF from a low level to a high level at the timing t11. Thereafter, the controller 19 changes the gate signal GC from the high level to the low level at a timing at which a time corresponding to the duty ratio DP (duty ratio DP×period T) has elapsed from the timing t11, and changes the gate signal GF from the high level to the low level at a timing at which a time corresponding to the duty ratio DS (duty ratio DS×period T) has elapsed from the timing t11. Thereafter, the controller 19 changes the gate signals GD and GE from the low level to the high level at a timing t12. Thereafter, the controller 19 changes the gate signal GD from the high level to the low level at a timing at which the time corresponding to the duty ratio DP (duty ratio DP×period T) has elapsed from the timing t12, and changes the gate signal GE from the high level to the low level at a timing at which the time corresponding to the duty ratio DS (duty ratio DS×period T) has elapsed from the timing t12. Although not illustrated, the controller 19 maintains the gate signals GA and GB at the low level. Note that in the electric power conversion system 1, the capacitor 9 is charged by repeating the operations performed in the period from the timing t11 to the timing t13 while changing the duty ratios DP and DS. As a result, the voltage VH gradually rises, as illustrated in part (G) of FIG. 4.

FIG. 5 illustrates an operation example of the driver 25 and the switching circuit S5. In FIG. 5, part (A) illustrates the waveform of the gate signal GF, part (B) illustrates a waveform of the gate signal GF1, part (C) illustrates a waveform of the gate signal GF2, part (D) illustrates the waveform of the voltage between the drain and the source (the drain-source voltage VDSF) of each of the transistors S11 and S12 in the switching circuit S5, part (E) illustrates the waveform of the current (the inductor current IL) flowing through the choke inductor 16 from the voltage line L21B to the voltage line L21A, part (F) illustrates a waveform of a current (a current ISF1) flowing from the drain to the source of the transistor S11, and part (G) illustrates a waveform of a current (a current ISF2) flowing from the drain to the source of the transistor S12.

At a timing t21, the controller 19 changes the gate signal GF from the low level to the high level (part (A) of FIG. 5). Based on the gate signal GF, the driving circuit DRV2 of the driver 25 changes the gate signal GF2 from the low level to the high level (part (C) of FIG. 5). This switches the transistor S12 from off to on. In the precharge period P1, the switch SW3 is off, and accordingly, the output impedance of the driving circuit DRV1 is in the high impedance state. In this example, the gate signal GF1 is at the low level in a period from the timing t21 to a timing t23 (part (B) of FIG. 5). Accordingly, the transistor S11 is off. In this way, in the period from the timing t21 to the timing t23, the transistor S11 is off and the transistor S12 is on, which causes the drain-source voltage VDSF of each of the transistors S11 and S12 to be 0 V (part (D) of FIG. 5).

In a period from the timing t21 to a timing t22, the current flowing through the choke inductor 16 gradually increases (part (E) of FIG. 5). Thereafter, in a period from the timing t22 to the timing t23, the current flowing through the choke inductor 16 gradually decreases. The timing t22 is a timing at which the gate signal GC changes from the high level to the low level, as illustrated in FIG. 4. In the transistor S12 that is on, the current ISF2 flows from the drain to the source in accordance with the inductor current IL (part (G) of FIG. 5).

At the timing t23, the controller 19 changes the gate signal GF from the high level to the low level (part (A) of FIG. 5). Based on the gate signal GF, the driving circuit DRV2 of the driver 25 changes the gate signal GF2 from the high level to the low level (part (C) of FIG. 5). This causes the transistor S12 to switch from on to off.

In this way, both the transistors S11 and S12 are caused to be off at the timing t23. At this timing t23, a counter electromotive force of the choke inductor 16 raises the voltage at the node N3, thus raising the drain-source voltage VSDF of the transistors S11 and S12 (part (D) of FIG. 5). When the voltage at the node N3 rises in this way and a voltage across the Zener diode DZ1 exceeds a Zener voltage, the Zener diode DZ1 is turned on, and a current flows from the node N3 through the Zener diode DZ1, the diode DD1, and the resistor R3 in this order. The magnitude of the current is adjustable by the resistor R3, for example. Due to the current, a gate voltage of the transistor S11 rises (part (B) of FIG. 5), causing the transistor S11 to be transiently on. As a result, the current ISF1 flows from the drain to the source of the transistor S11 (part (F) of FIG. 5). In this way, in a period from the timing t23 to a timing t24, the drain-source voltage VDSF of each of the transistors S11 and S12 is clamped (part (D) of FIG. 5).

At and after the timing t23, the current ISF1 gradually decreases (part (F) of FIG. 5) in accordance with the inductor current IL (part (E) of FIG. 5). Thereafter, at the timing t24, the current ISF1 substantially ceases to flow.

In the precharge operation, the driver 25 and the switching circuit S5 repeat such operations. This similarly applies to operations of the driver 26 and the switching circuit S6.

As illustrated in FIG. 4, in the precharge operation, the voltage VH gradually rises (part (G) of FIG. 4). Thereafter, when the voltage VH reaches the target voltage, the precharge controller 31 stops generating the duty ratios DP and DS. The precharge operation thus ends. Thereafter, the switches SW1 and SW2 are turned on.

Thereafter, in the electric power conversion period P2, the switch controller 35 of the controller 19 causes the switch SW3 of each of the drivers 25 and 26 to be on, through the use of the control signal SSW3. The electric power conversion controller 32 of the controller 19 generates the duty ratios DP and DS, based on the voltages VH and VL. The gate signal generator 33 generates the gate signals GA to GD, based on the duty ratio DP generated by the electric power conversion controller 32. The driver 21 generates the gate signals GA1 to GD1, based on the gate signals GA to GE, respectively, and the switcher 12 performs the switching operation, based on the gate signals GA1 to GD1. The gate signal generator 34 generates the gate signals GE and GF, based on the duty ratio DS generated by the electric power conversion controller 32. The driver 25 generates the gate signals GF1 and GF2, based on the gate signal GF, and the driver 26 generates the gate signals GE1 and GE2, based on the gate signal GE. That is, in the electric power conversion period P2, the switch SW3 is on in each of the drivers 25 and 26, and accordingly, the driving circuit DRV1 of the driver 25 generates the gate signal GF1, and the driving circuit DRV1 of the driver 26 generates the gate signal GE1. The rectifier 14 performs the switching operation, based on the gate signals GE1, GE2, GF1, and GF2. This causes the electric power conversion apparatus 10 to convert electric power supplied from the high voltage battery BH and to supply the converted electric power to the low voltage battery BL.

Note that the electric power conversion system 1 may start the electric power conversion operation immediately after the end of the precharge operation, or may perform, after the end of the precharge operation, a voltage-maintaining operation of maintaining the voltage VH at or near the target voltage by generating the duty ratios DP and DS, and may thereafter start the electric power conversion operation.

As described above, in the electric power conversion system 1, the Zener diode DZ1 is provided and the output impedance of the driving circuit DRV1 is caused to be in the high impedance state in the precharge period P1. This makes it possible to prevent an excessive voltage from being applied to the transistors S11 and S12.

That is, for example, as illustrated in FIG. 6, when a driver 25R and a switching circuit S5R are used without the switch SW3, the resistor R3, the diode DD1, and the Zener diode DZ1, for example, there is a possibility that an excessive voltage is applied to the transistors S11 and S12. That is, for example, when the voltage at the node N3 rises due to the counter electromotive force of the choke inductor 16, an avalanche breakdown occurs in each of the transistors S11 and S12, causing an avalanche current to flow from the drain to the source. When the avalanche breakdown occurs in the transistors S11 and S12 in this way, various electrical characteristics of the transistors including an on-resistance, a leakage current, and a drain-source withstand voltage can be degraded.

In contrast, in the electric power conversion system 1, the Zener diode DZ1 is provided and the output impedance of the driving circuit DRV1 is caused to be in the high impedance state in the precharge period P1. Thus, when the voltage at the node N3 rises and the voltage across the Zener diode DZ1 exceeds the Zener voltage, the Zener diode DZ1 is turned on, which raises the gate voltage of the transistor S11 and causes the transistor S11 to be transiently on. As a result, the drain-source voltage VDSF of each of the transistors S11 and S12 is clamped. This makes it possible to prevent the avalanche breakdown from occurring in the transistors S11 and S12. Accordingly, it is possible to prevent the electrical characteristics of the transistors S11 and S12 from being easily degraded.

Methods for preventing an excessive voltage from being applied to the transistors S11 and S12 may include a method illustrated in FIG. 7, for example. This switching circuit S5S includes a Zener diode DZS. The Zener diode DZS has an anode coupled to the terminal TB of the switching circuit S5S, and a cathode coupled to the terminal TA of the switching circuit S5S. In this case, for example, when the voltage at the node N3 rises due to the counter electromotive force of the choke inductor 16 and a voltage across the Zener diode DZS exceeds the Zener voltage, the Zener diode DZS is turned on and the drain-source voltage VDSF of each of the transistors S11 and S12 is thus clamped. However, in this case, a current is to flow through the Zener diode DZS, which makes it necessary for the Zener diode DZS to be large in size and have a high energy resistance. This can result in an increase in size of the electric power conversion apparatus.

In contrast, in the electric power conversion system 1, when the voltage at the node N3 rises and the voltage across the Zener diode DZ1 exceeds the Zener voltage, the Zener diode DZ1 is turned on and the gate voltage of the transistor S11 rises. This causes the transistor S11 to be transiently on, causing the current ISF1 to flow from the drain to the source of the transistor S11. That is, current is allowed to flow mainly through the transistor S11. The transistor S11 performs the switching operation together with the transistor S12 in the electric power conversion period P2, and thus has a high energy resistance. In contrast, current to flow through the Zener diode DZ1 is not so large, and the Zener diode DZ1 may thus be a small-sized Zener diode having a low energy resistance. This allows for avoidance of an increase in size of the electric power conversion apparatus in the electric power conversion system 1.

As described above, in the electric power conversion system 1, for example, the switching circuit S5 includes the transistor S11 that is operable based on the gate signal GF1 and the transistor S12 that is operable based on the gate signal GF2. The transistors S11 and S12 each include the drain, the source, and the gate. The switching circuit S5 includes the Zener diode DZ1 that is provided on a path coupling the drain and the gate of the transistor S11 to each other and that is configured to clamp the voltage. The driver 25 includes the output terminal T1 and the output terminal T2, and is configured to, based on the gate signal GF supplied from the controller 19, output the gate signal GF1 from the output terminal T1 and output the gate signal GF2 from the output terminal T2. The controller 19 is configured to, in the precharge period different from the electric power conversion period P2 in which electric power is supplied from the terminals T11 and T12 toward the terminals T21 and T22, control the operations of the switcher 12 and the rectifier 14 to cause electric power to be supplied from the terminals T21 and T22 toward the terminals T11 and T12, and set the output impedance of the output terminal T1 of the driver 25 to the high impedance state. Accordingly, in the electric power conversion system 1, it is possible to prevent an excessive voltage from being applied to the transistors S11 and S12.

Further, in the electric power conversion system 1, the switching circuit S5 includes the diode DD1 that is provided on the path coupling the drain and the gate of the transistor S11 to each other and that is configured to block a current flowing through the path in a direction from the gate to the drain. This makes it possible to prevent a current from flowing from the driving circuit DRV1 to the transistors S11 and S12 via the resistor R1, the resistor R3, and the Zener diode DZ1 when the switch SW3 is turned on and the driving circuit DRV1 sets the gate signal GF1 at the high level in the electric power conversion period P2, for example.

Further, in the electric power conversion system 1, the driver 25 includes the driving circuit DRV1 configured to output the gate signal GF1 from the output terminal T1, and the switch SW3 configured to switch on and off supply of power to the driving circuit DRV1 by switching on and off supply of the power supply voltage VDD to the driving circuit DRV1. In addition, the controller 19 is configured to set the output impedance of the output terminal T1 of the driver 25 to the high impedance state by turning off the switch SW3. This causes, for example, the Zener diode DZ1 to be on, thereby making it possible to raise the gate voltage of the transistor S11 and cause the transistor S11 to be transiently on. As a result, in the electric power conversion system 1, it is possible to prevent an excessive voltage from being applied to the transistors S11 and S12.

Further, in the electric power conversion system 1, the switching circuit S5 includes the resistor R3 provided on the path coupling the drain and the gate of the transistor S11 to each other. This makes it possible to adjust the amount of the current that flows through the Zener diode DZ1 when the Zener diode DZ1 is turned on.

Effects

According to the present example embodiment, as described above, for example, the switching circuit includes the transistor S11 that is operable based on the gate signal GF1 and the transistor S12 that is operable based on the gate signal GF2. The transistors S11 and S12 each include the drain, the source, and the gate. The switching circuit includes the Zener diode that is provided on the path coupling the drain and the gate of the transistor S11 to each other and that is configured to clamp the voltage. The driver includes the output terminal T1 and the output terminal T2, and is configured to, based on the gate signal supplied from the controller, output the gate signal GF1 from the output terminal T1 and output the gate signal GF2 from the output terminal T2. The controller is configured to, in the precharge period different from the electric power conversion period in which electric power is supplied from the terminals T11 and T12 toward the terminals T21 and T22, control the operations of the switcher and the rectifier to cause electric power to be supplied from the terminals T21 and T22 toward the terminals T11 and T12, and set the output impedance of the output terminal T1 of the driver to the high impedance state. This makes it possible to prevent an excessive voltage from being applied to the transistors S11 and S12.

In the present example embodiment, the switching circuit includes the diode that is provided on the path coupling the drain and the gate of the transistor S11 to each other and that is configured to block a current flowing in the direction from the gate to the drain on the path. This makes it possible to prevent a current from flowing from the driving circuit DRV1 to the transistors S11 and S12 via the resistor R1 and the resistor R3 when the switch is turned on and the driving circuit DRV1 sets the gate signal GF1 at the high level in the electric power conversion period, for example.

In the present example embodiment, the driver includes the driving circuit DRV1 configured to output the gate signal GF1 from the output terminal T1, and the switch configured to switch on and off the supply of power to the driving circuit DRV1 by switching on and off the supply of the power supply voltage to the driving circuit DRV1. In addition, the controller is configured to set the output impedance of the output terminal T1 of the driver to the high impedance state by turning off the switch. This causes the Zener diode to be on, thereby making it possible to raise the gate voltage of the transistor S11 and cause the transistor S11 to be transiently on. As a result, it is possible to prevent an excessive voltage from being applied to the transistors S11 and S12.

In the present example embodiment, the switching circuit includes the resistor R3 provided on the path coupling the drain and the gate of the transistor S11 to each other. This makes it possible to adjust the amount of the current that flows through the Zener diode when the Zener diode is turned on.

Modification Example 1

In the foregoing example embodiment, as illustrated in FIG. 2, the Zener diode DZ1, the diode DD1, and the resistor R3 are provided on the path coupling the drain and the gate of the transistor S11 to each other. In addition to these devices, a capacitor C1 may further be provided as in a switching circuit S5A illustrated in FIG. 8, for example. The capacitor C1 has one end coupled to the terminal TA of the switching circuit S5A, and another end coupled to the gate of the transistor S11. The capacitor C1 is coupled in parallel to a circuit including the Zener diode DZ1, the diode DD1, and the resistor R3. Here, the capacitor C1 corresponds to a specific but non-limiting example of a "first capacitor" in one embodiment of the disclosure. This makes it possible to suppress a voltage peak, of the drain-source voltage VDSF illustrated in part (D) of FIG. 5, near the timing t23.

Modification Example 2

In the foregoing example embodiment, as illustrated in FIG. 2, the resistor R3 is provided on the path coupling the drain and the gate of the transistor S11 to each other; however, this is non-limiting. Alternatively, the resistor R3 may be omitted, as in a switching circuit S5B illustrated in FIG. 9, for example. For example, if there is no need to limit a current flowing through the Zener diode DZ1 when the Zener diode DZ1 is turned on, the resistor R3 may be omitted in this way.

Modification Example 3

In the foregoing example embodiment, as illustrated in FIG. 2, the diode DD1 is provided on the path coupling the drain and the gate of the transistor S11 to each other; however, this is non-limiting. Alternatively, as in a switching circuit S5C illustrated in FIG. 10, for example, a switch SW4 may be provided on the path coupling the drain and the gate of the transistor S11 to each other. In this example, the switch SW4 has one end coupled to the anode of the Zener diode DZ1, and another end coupled to the resistor R3. The switch SW4 operates based on a control signal SSW4 supplied from a controller 19C according to the present modification example. For example, in the precharge period P1, the switch SW3 is off and the switch SW4 is on. In this case, when the Zener diode DZ1 is turned on, a current flows through the Zener diode, the switch SW4, and the resistor R3 in this order. Further, for example, in the electric power conversion period P2, the switch SW3 is on and the switch SW4 is off. In this case, no current flows through the switch SW4. Here, the switch SW4 corresponds to a specific but non-limiting example of the "second device" in one embodiment of the disclosure. The switch SW4 thus limits the direction of a current flowing through the path coupling the drain and the gate of the transistor S11 to each other, to cause the current to flow in the direction from the drain to the source.

Modification Example 4

In the foregoing example embodiment, in the driver 25, the switch SW3 couples the power supply node of the power supply voltage VDD and the power supply terminal of the driving circuit DRV1 to each other by being turned on; however, this is non-limiting. Alternatively, as in a driver 25D illustrated in FIG. 11, for example, the switch SW3 may couple the power supply node of the power supply voltage SGND and the reference power supply terminal of the driving circuit DRV1 to each other. In this example, the switch SW3 has the one end coupled to the reference power supply terminal of the driving circuit DRV1, and the other end coupled to the power supply node of the power supply voltage SGND. In this case also, it is possible for the controller 19 to set the output impedance of the output terminal T1 of the driver 25D to the high impedance state by turning off the switch SW3.

Modification Example 5

In the foregoing example embodiment, the driver 25 includes the two driving circuits DRV1 and DRV2; however, this is non-limiting. Alternatively, as in a driver 25E illustrated in FIG. 12, for example, a single driving circuit DRV2 may be provided. The driver 25E includes the driving circuit DRV2 and the switch SW3. The switch SW3 has the one end coupled to an output terminal of the driving circuit DRV2, and the other end coupled to the output terminal T1 of the driver 25E. Here, the driving circuit DRV2 corresponds to a specific but non-limiting example of the "driving circuit" in one embodiment of the disclosure. In this case also, it is possible for the controller 19 to set the output impedance of the output terminal T1 of the driver 25E to the high impedance state by turning off the switch SW3.

Modification Example 6

In the foregoing example embodiment, the output impedance of the driving circuit DRV1 is caused to be in the high impedance state by turning off the switch SW3 in the driver 25. However, this is non-limiting, and the driving circuit DRV1 itself may be configured to cause the output impedance to be in the high impedance state. The present modification example will be described in detail below.

FIG. 13 illustrates a configuration example of a driver 25F according to the present modification example. The driver 25F includes a driving circuit DRV1A. The driving circuit DRV1A is configured to generate the gate signal GF1, based on the gate signal GF supplied from a controller 19F according to the present modification example. Further, the driving circuit DRV1A is configured to cause the output impedance to be in the high impedance state, based on a control signal CTL supplied from the controller 19F.

FIG. 14 illustrates a configuration example of the driving circuit DRV1A. The driving circuit DRV1A includes a driving control circuit 41, buffers 42 and 43, and transistors 44 and 45.

The driving control circuit 41 is configured to control an operation of the driving circuit DRV1A, based on the gate signal GF and the control signal CTL. When the control signal CTL is at a high level (an active level), for example, the driving control circuit 41 generates signals SP and SN, based on the gate signal GF. Specifically, the driving control circuit 41 sets both the signals SP and SN to a high level when the gate signal GF is at the low level, and sets both the signals SP and SN to a low level when the gate signal GF is at the high level. Further, when the control signal CTL is at a low level (an inactive level), the driving control circuit 41 sets the signal SP to the high level and the signal SN to the low level.

The buffer 42 is configured to drive the transistor 44, based on the signal SP. The buffer 43 is configured to drive the transistor 45, based on the signal SN.

The transistor 44 includes a P-type field-effect transistor, for example. The transistor 44 includes a body diode D44. The transistor 44 has a gate to be supplied with an output signal of the buffer 42, a source coupled to the power supply node of the power supply voltage VDD, and a drain coupled to a drain of the transistor 45 and to the output terminal T1 of the driver 25F.

The transistor 45 includes an N-type field-effect transistor, for example. The transistor 45 includes a body diode D45. The transistor 45 has a gate to be supplied with an output signal of the buffer 43, the drain coupled to the drain of the transistor 44 and to the output terminal T1 of the driver 25F, and a source coupled to the power supply node of the power supply voltage SGND.

Here, the driving circuit DRV1A corresponds to a specific but non-limiting example of the "driving circuit" in one embodiment of the disclosure. The transistor 44 corresponds to a specific but non-limiting example of a "first driving switching device" in one embodiment of the disclosure. The transistor 45 corresponds to a specific but non-limiting example of a "second driving switching device" in one embodiment of the disclosure.

With this configuration, for example, when the control signal CTL is at the high level (the active level), the driving circuit DRV1A generates the gate signal GF1 corresponding to the gate signal GF. Specifically, when the gate signal GF is at the low level, the driving control circuit 41 sets both the signals SP and SN to the high level, which turns on the transistor 45 and turns off the transistor 44. This causes the gate signal GF1 to be at the low level. Further, when the gate signal GF is at the high level, the driving control circuit 41 sets both the signals SP and SN to the low level, which turns on the transistor 44 and turns off the transistor 45. This causes the gate signal GF1 to be at the high level. Further, for example, when the control signal CTL is at the low level (the inactive level), the driving control circuit 41 sets the signal SP to the high level and the signal SN to the low level, which turns off both the transistors 44 and 45. This causes the output impedance of the driving circuit DRV1A to be in the high impedance state.

In this way, the controller 19F is configured to set the output impedance of the output terminal T1 of the driver 25F to the high impedance state by performing control, through the use of the control signal CTL, to turn off both the transistors 44 and 45.

Modification Example 7

In the foregoing example embodiment, the Zener diode DZ1, the diode DD1, and the resistor R3 are provided on the path coupling the drain and the gate of the transistor S11 to each other; however, this is non-limiting. For example, in addition to this, a Zener diode, a diode, and a resistor may be provided also on a path coupling the drain and the gate of the transistor S12 to each other. The present modification example will be described in detail below.

FIG. 15 illustrates a configuration example of a driver 25G and a switching circuit S5G according to the present modification example.

The driver 25G includes the driving circuits DRV1A and DRV2A. The driving circuit DRV1A is configured to generate the gate signal GF1, based on the gate signal GF supplied from a controller 19G according to the present modification example. Further, the driving circuit DRV1A is configured to cause the output impedance to be in the high impedance state, based on a control signal CTL1 supplied from the controller 19G. Similarly, the driving circuit DRV2A is configured to generate the gate signal GF2, based on the gate signal GF supplied from the controller 19G. Further, the driving circuit DRV2A is configured to cause the output impedance to be in the high impedance state, based on a control signal CTL2 supplied from the controller 19G. The driving circuits DRV1A and DRV2A each have the circuit configuration illustrated in FIG. 14, for example.

The switching circuit S5G includes a Zener diode DZ2, a diode DD2, and a resistor R6. The Zener diode DZ2 has a cathode coupled to the terminal TA of the switching circuit S5G, and an anode coupled to an anode of the diode DD2. The diode DD2 has the anode coupled to the anode of the Zener diode DZ2, and a cathode coupled to the resistor R6. The resistor R6 has one end coupled to the cathode of the diode DD2, and another end coupled to the gate of the transistor S12.

Here, the Zenor diode DZ2 corresponds to a specific but non-limiting example of a "third device" in one embodiment of the disclosure. The diode DD2 corresponds to a specific but non-limiting example of a "fourth device" in one embodiment of the disclosure. The driver 25G corresponds to a specific but non-limiting example of the "driver" in one embodiment of the disclosure.

FIG. 16 illustrates example operations of the driver 25G and the switching circuit S5G according to the present modification example in the precharge period P1. In FIG. 16, part (A) illustrates the waveform of the gate signal GE, part (B) illustrates the waveform of the gate signal GF, part (C) illustrates the waveform of the gate signal GF1, part (D) illustrates the waveform of the gate signal GF2, part (E) illustrates the operation of the driving circuit DRV1A, and part (F) illustrates the operation of the driving circuit DRV2A. Dotted lines in parts (C) and (D) of FIG. 16 each indicate that the output impedance is in the high impedance state.

As illustrated in FIG. 16, the controller 19G generates pulses of the gate signal GE and pulses of the gate signal GF alternately (parts (A) and (B) of FIG. 16). For example, the controller 19G changes the gate signal GF from the low level to the high level at a timing t32, and changes the gate signal GF from the high level to the low level at a timing t33. Similarly, the controller 19G changes the gate signal GF from the low level to the high level at a timing t36, and changes the gate signal GF from the high level to the low level at a timing t37. The controller 19G changes the gate signal GF from the low level to the high level at a timing t40, and changes the gate signal GF from the high level to the low level at a timing t41. The controller 19G changes the gate signal GF from the low level to the high level at a timing t44, and changes the gate signal GF from the high level to the low level at a timing t45.

In this example, through the use of the control signal CTL1, the controller 19G changes, at a timing t31 before the timing t32, the operation of the driving circuit DRV1A from a mode of causing the output impedance to be in the high impedance state to a mode of outputting a signal, and changes, at a timing t34 after the timing t33, the operation of the driving circuit DRV1A from the mode of outputting the signal to the mode of causing the output impedance to be in the high impedance state (part (E) of FIG. 16).

Further, through the use of the control signal CTL2, the controller 19G changes, at a timing t35 before the timing t36, the operation of the driving circuit DRV2A from the mode of causing the output impedance to be in the high impedance state to the mode of outputting the signal, and changes, at a timing t38 after the timing t37, the operation of the driving circuit DR V2A from the mode of outputting the signal to the mode of causing the output impedance to be in the high impedance state (part (F) of FIG. 16).

Further, through the use of the control signal CTL1, the controller 19G changes, at a timing t39 before the timing t40, the operation of the driving circuit DRV1A from the mode of causing the output impedance to be in the high impedance state to the mode of outputting the signal, and changes, at a timing t42 after the timing t41, the operation of the driving circuit DRV1A from the mode of outputting the signal to the mode of causing the output impedance to be in the high impedance state (part (E) of FIG. 16).

Further, through the use of the control signal CTL2, the controller 19G changes, at a timing t43 before the timing t44, the operation of the driving circuit DRV2A from the mode of causing the output impedance to be in the high impedance state to the mode of outputting the signal, and changes, at a timing t46 after the timing t45, the operation of the driving circuit DRV2A from the mode of outputting the signal to the mode of causing the output impedance to be in the high impedance state (part (F) of FIG. 16).

In a period from the timing t31 to the timing t34, the driving circuit DRV1A changes the gate signal GF1 from the low level to the high level at the timing t32, and changes the gate signal GF1 from the high level to the low level at the timing t33 (part (C) of FIG. 16), based on the gate signal GF. This causes the transistor S11 to be on in a period from the timing t32 to the timing t33. The output impedance of the driving circuit DRV2A is in the high impedance state in the period from the timing t32 to the timing t33 (parts (D) and (F) of FIG. 16). For example, in a short period from the timing t33, the Zener diode DZ2 is on and the transistor S12 is transiently on. The same applies to a period from the timing t39 to the timing t42.

In a period from the timing t35 to the timing t38, the driving circuit DRV2A changes the gate signal GF2 from the low level to the high level at the timing t36, and changes the gate signal GF2 from the high level to the low level at the timing t37 (part (D) of FIG. 16), based on the gate signal GF. This causes the transistor S12 to be on in a period from the timing t36 to the timing t37. The output impedance of the driving circuit DRV1A is in the high impedance state in the period from the timing t36 to the timing t37 (parts (C) and (E) of FIG. 16). For example, in a short period from the timing t37, the Zener diode DZ1 is on and the transistor S11 is transiently on. The same applies to a period from the timing t43 to the timing t46.

Note that the timings illustrated in FIG. 16 are one example and non-liming.

Modification Example 8

In the foregoing example embodiment, the present technology is applied to the center-tapped electric power conversion circuit; however, this is non-limiting. The present modification example will be described in detail below with reference to some examples.

Circuit Example E1

Figure 17:
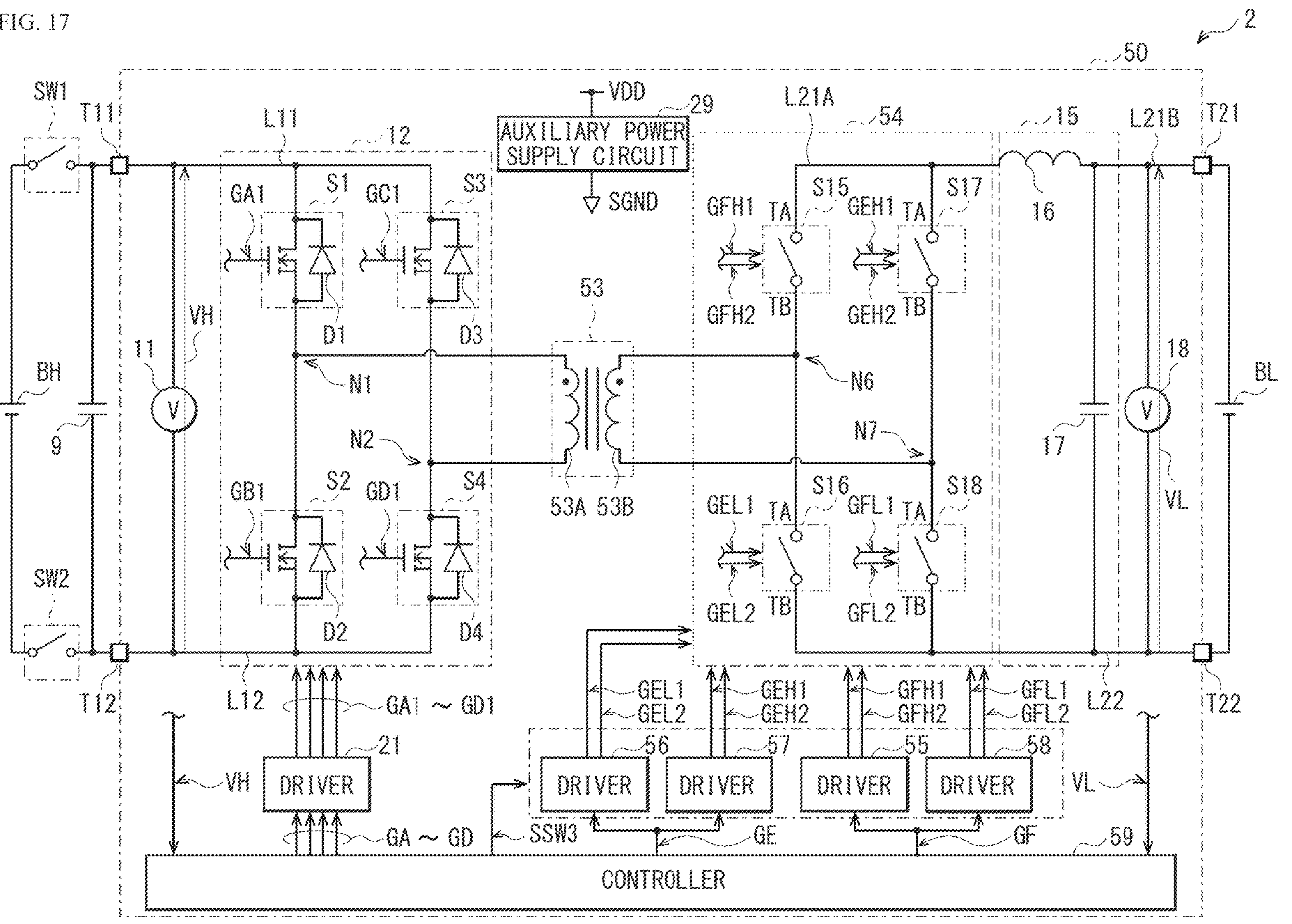
FIG. 17 is a circuit diagram illustrating a configuration example of an electric power conversion system according to another modification example.

FIG. 17 illustrates a configuration example of an electric power conversion system 2 according to the present modification example. The electric power conversion system 2 includes an electric power conversion apparatus 50. The electric power conversion apparatus 50 includes a transformer 53, a rectifier 54, drivers 55 to 58, and a controller 59.

The transformer 53 includes windings 53A and 53B. The winding 53A has one end coupled to the node N1 in the switcher 12, and another end coupled to the node N2 in the switcher 12. The winding 53B has one end coupled to a node N6 in the rectifier 54, and another end coupled to a node N7 in the rectifier 54.

The rectifier 54 is a full-bridge circuit, and includes switching circuits S15 to S18. The switching circuit S15 has the terminal TA coupled to the voltage line L21A, and the terminal TB coupled to the node N6. The switching circuit S15 has a control terminal to be supplied with gate signals GFH1 and GFH2. The switching circuit S16 has the terminal TA coupled to the node N6, and the terminal TB coupled to the reference voltage line L22. The switching circuit S16 has a control terminal to be supplied with gate signals GEL1 and GEL2. The switching circuit S17 has the terminal TA coupled to the voltage line L21A, and the terminal TB coupled to the node N7. The switching circuit S17 has a control terminal to be supplied with gate signals GEH1 and GEH2. The switching circuit S18 has the terminal TA coupled to the node N7, and the terminal TB coupled to the reference voltage line L22. The switching circuit S18 has a control terminal to be supplied with gate signals GFL1 and GFL2.

The driver 55 is configured to generate the gate signals GFH1 and GFH2, based on the gate signal GF supplied from the controller 59, and to drive the switching circuit S15 through the use of the gate signals GFH1 and GFH2. The driver 56 is configured to generate the gate signals GEL1 and GEL2, based on the gate signal GE supplied from the controller 59, and to drive the switching circuit S16 through the use of the gate signals GEL1 and GEL2. The driver 57 is configured to generate the gate signals GEH1 and GEH2, based on the gate signal GE supplied from the controller 59, and to drive the switching circuit S17 through the use of the gate signals GEH1 and GEH2. The driver 58 is configured to generate the gate signals GFL1 and GFL2, based on the gate signal GF supplied from the controller 59, and to drive the switching circuit S18 through the use of the gate signals GFL1 and GFL2.

Figure 18:
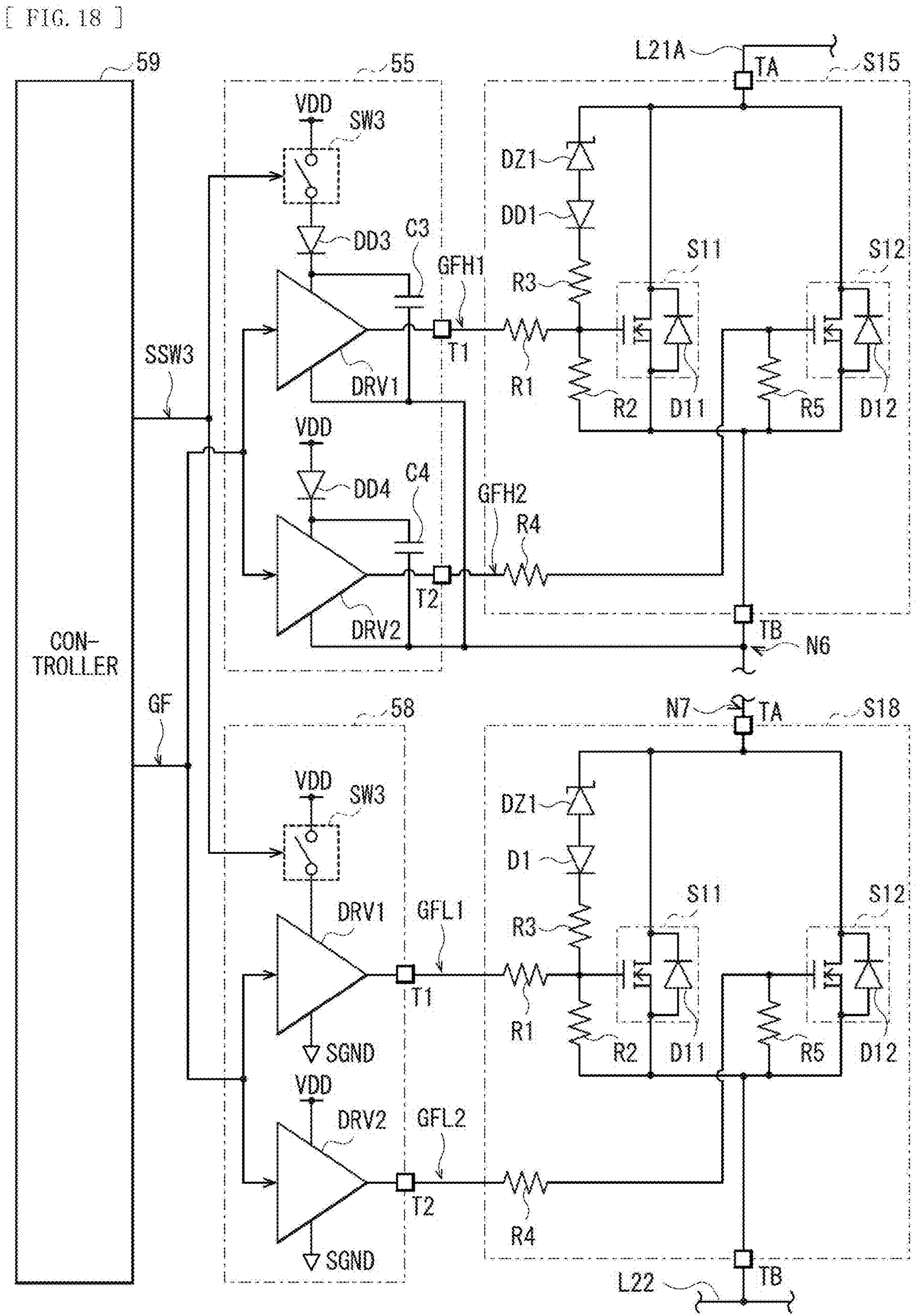
FIG. 18 is a circuit diagram illustrating a configuration example of a driver and a switching circuit illustrated in FIG. 17.

FIG. 18 illustrates a configuration example of the drivers 55 and 58 and the switching circuits S15 and S18. Note that the driver 56 and the switching circuit S16 have circuit configurations similar to circuit configurations of the driver 58 and the switching circuit S18. The driver 57 and the switching circuit S17 have circuit configurations similar to circuit configurations of the driver 55 and the switching circuit S15.

The driver 55 includes the switch SW3, diodes DD3 and DD4, the driving circuits DRV1 and DRV2, capacitors C3 and C4, and the output terminals T1 and T2.

The switch SW3 is configured to supply power to the driving circuit DRV1, based on a control signal supplied from the controller 59. The switch SW3 has the one end coupled to the power supply node of the power supply voltage VDD, and the other end coupled to an anode of the diode DD3.

The diode DD3 has the anode coupled to the other end of the switch SW3, and a cathode coupled to the power supply terminal of the driving circuit DRV1 and to the capacitor C3.

The driving circuit DRV1 is configured to generate the gate signal GFH1, based on the gate signal GF supplied from the controller 59, and to drive the transistor S11 of the switching circuit S15 through the use of the gate signal GFH1. The driving circuit DRV1 has the output terminal coupled to the output terminal T1 of the driver 55, the power supply terminal coupled to the cathode of the diode DD3, and the reference power supply terminal coupled to the node N6.

The capacitor C3 has one end coupled to the cathode of the diode DD3 and to the power supply terminal of the driving circuit DRV1, and another end coupled to the node N6.

The diode DD4 has an anode coupled to the power supply node of the power supply voltage VDD, and a cathode coupled to the power supply terminal of the driving circuit DRV2 and to the capacitor C4.

The driving circuit DRV2 is configured to generate the gate signal GFH2, based on the gate signal GF supplied from the controller 59, and to drive the transistor S12 of the switching circuit S15 through the use of the gate signal GFH2. The driving circuit DRV2 has the output terminal coupled to the output terminal T2 of the driver 55, the power supply terminal coupled to the cathode of the diode DD4, and the reference power supply terminal coupled to the node N6.

The capacitor C4 has one end coupled to the cathode of the diode DD4 and to the power supply terminal of the driving circuit DRV2, and another end coupled to the node N6.

The switching circuit S15 has a circuit configuration similar to the circuit configuration of the switching circuit S5 (FIG. 2) according to the foregoing example embodiment.

In the driver 55, the diodes DD3 and DD4 and the capacitors C3 and C4 configure a bootstrap circuit. That is, as illustrated in FIG. 17, the switching circuit S15 to be driven by the driver 55 is coupled to the node N6, and is not coupled to the reference voltage line L22. Accordingly, in the driver 55, the provision of the bootstrap circuit allows the driving circuits DRV1 and DRV2 to operate with respect to a voltage at the node N6.

The driver 58 includes the switch SW3, the driving circuits DRV1 and DRV2, and the output terminals T1 and T2. The driver 58 has a circuit configurations similar to the circuit configuration of the driver 25 (FIG. 2) according to the foregoing example embodiment.

The switching circuit S18 has a circuit configuration similar to the circuit configuration of the switching circuit S5 (FIG. 2) according to the foregoing example embodiment.

As with the controller 19 according to the foregoing example embodiment, the controller 59 is configured to control the operation of the electric power conversion apparatus 50 by controlling the operations of the switcher 12 and the rectifier 54, based on the voltage VH detected by the voltage sensor 11 and the voltage VL detected by the voltage sensor 18.

In the electric power conversion system 2, in the pre-charge period P1, the output impedance of the output terminal T1 of the driver 55 is caused to be in the high impedance state, the output impedance of the output terminal T1 of the driver 56 is caused to be in the high impedance state, the output impedance of the output terminal T1 of the driver 57 is caused to be in the high impedance state, and the output impedance of the output terminal T1 of the driver 58 is caused to be in the high impedance state, as in the foregoing example embodiment. This makes it possible to prevent an excessive voltage from being applied to the transistors S11 and S12 in each of the switching circuits S15 to S18.

Circuit Example 2

Figure 19:
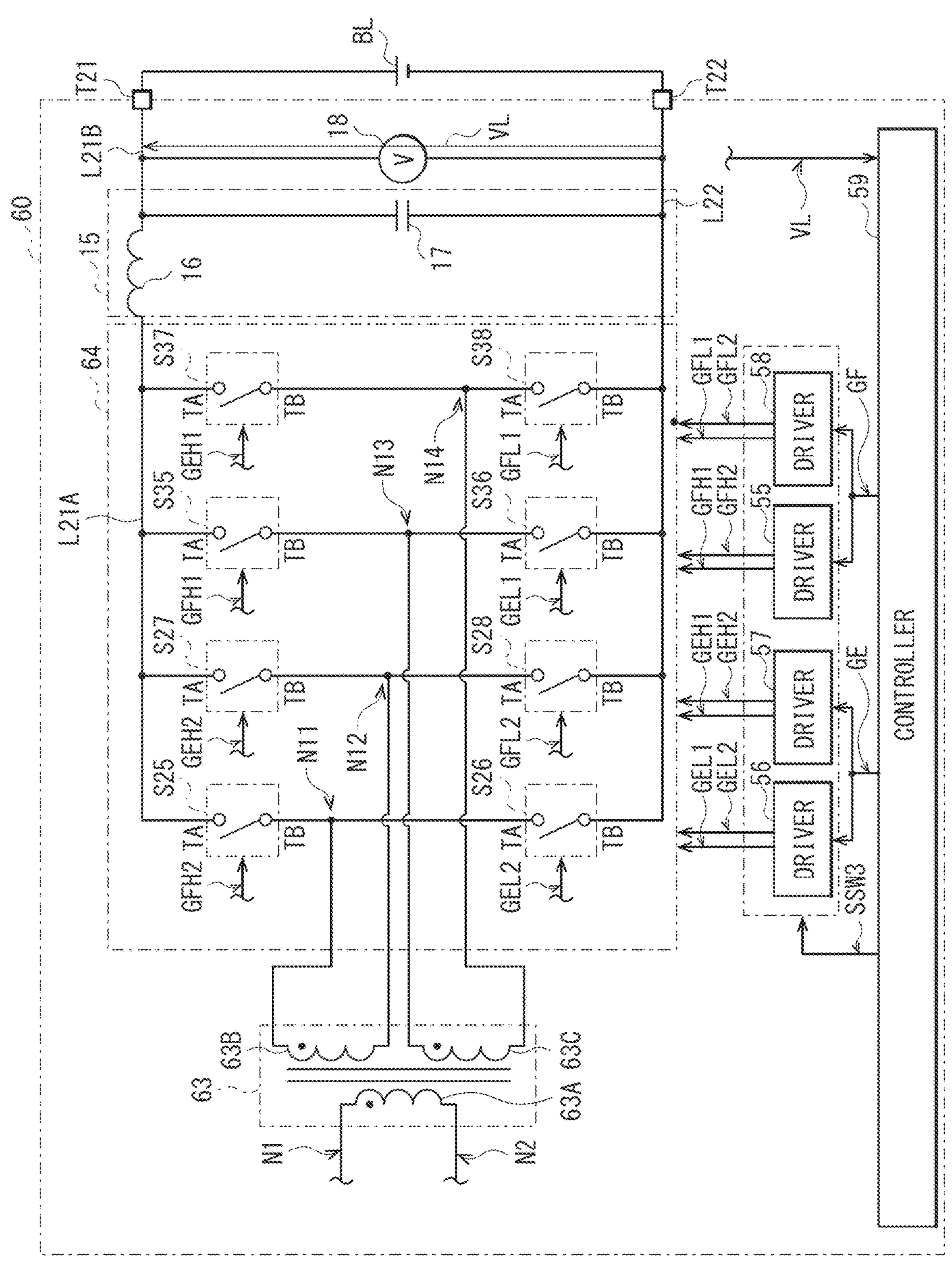
FIG. 19 is a circuit diagram illustrating a configuration example of an electric power conversion apparatus in an electric power conversion system according to another modification example.

FIG. 19 illustrates a configuration example of an electric power conversion apparatus 60 of another electric power conversion system according to the present modification example. FIG. 19 illustrates mainly the secondary-side circuitry of the electric power conversion apparatus 60. The primary-side circuitry is similar to that of the electric power conversion apparatus 50 (FIG. 17). The electric power conversion apparatus 60 includes a transformer 63, a rectifier 64, the drivers 55 to 58, and the controller 59.

The transformer 63 includes windings 63A, 63B, and 63C. The winding 63A has one end coupled to the node N1 in the switcher 12, and another end coupled to the node N2 in the switcher 12. The winding 63B has one end coupled to a node N11 in the rectifier 64, and another end coupled to a node N12 in the rectifier 64. The winding 63C has one end coupled to a node N13 in the rectifier 64, and another end coupled to a node N14 in the rectifier 64.

The rectifier 64 includes switching circuits S25 to S28 and S35 to S38. The switching circuit S25 has the terminal TA coupled to the voltage line L21A, and the terminal TB coupled to the node N11. The switching circuit S25 has a control terminal to be supplied with the gate signal GFH2. The switching circuit S26 has the terminal TA coupled to the node N11, and the terminal TB coupled to the reference voltage line L22. The switching circuit S26 has a control terminal to be supplied with the gate signal GEL2. The switching circuit S27 has the terminal TA coupled to the voltage line L21A, and the terminal TB coupled to the node N12. The switching circuit S27 has a control terminal to be supplied with the gate signal GEH2. The switching circuit S28 has the terminal TA coupled to the node N12, and the terminal TB coupled to the reference voltage line L22. The switching circuit S28 has a control terminal to be supplied with the gate signal GFL2. The switching circuit S35 has the terminal TA coupled to the voltage line L21A, and the terminal TB coupled to the node N13. The switching circuit S35 has a control terminal to be supplied with the gate signal GFH1. The switching circuit S36 has the terminal TA coupled to the node N13, and the terminal TB coupled to the reference voltage line L22. The switching circuit S36 has a control terminal to be supplied with the gate signal GEL1. The switching circuit S37 has the terminal TA coupled to the voltage line L21A, and the terminal TB coupled to the node N14. The switching circuit S37 has a control terminal to be supplied with the gate signal GEH1. The switching circuit S38 has the terminal TA coupled to the node N14, and the terminal TB coupled to the reference voltage line L22. The switching circuit S38 has a control terminal to be supplied with the gate signal GFL1.

The driver 55 is configured to generate the gate signals GFH1 and GFH2, based on the gate signal GF supplied from the controller 59, and to drive the switching circuit S35 through the use of the gate signal GFH1 and drive the switching circuit S25 through the use of the gate signal GFH2. The driver 56 is configured to generate the gate signals GEL1 and GEL2, based on the gate signal GE supplied from the controller 59, and to drive the switching circuit S36 through the use of the gate signal GEL1 and drive the switching circuit S26 through the use of the gate signal GEL2. The driver 57 is configured to generate the gate signals GEH1 and GEH2, based on the gate signal GE supplied from the controller 59, and to drive the switching circuit S37 through the use of the gate signal GEH1 and drive the switching circuit S27 through the use of the gate signal GEH2. The driver 58 is configured to generate the gate signals GFL1 and GFL2, based on the gate signal GF supplied from the controller 59, and to drive the switching circuit S38 through the use of the gate signal GFL1 and drive the switching circuit S28 through the use of the gate signal GFL2.

Figure 20:
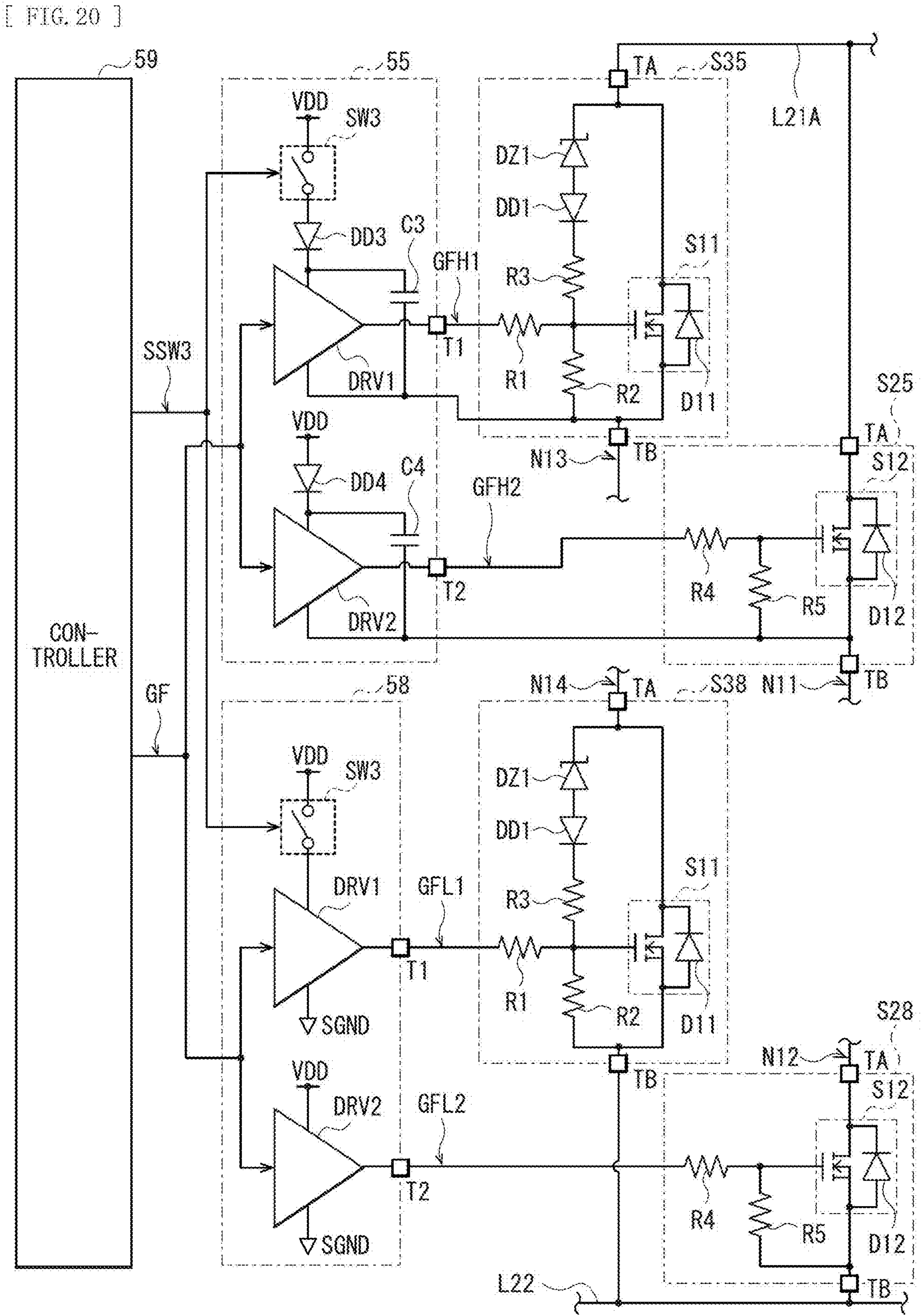
FIG. 20 is a circuit diagram illustrating a configuration example of a driver and a switching circuit illustrated in FIG. 19.

FIG. 20 illustrates a configuration example of the drivers 55 and 58 and the switching circuits S35, S25, S38, and S28. Note that the driver 56 and the switching circuits S36 and S26 have circuit configurations similar to circuit configurations of the driver 58 and the switching circuits S38 and S28. Note that the driver 57 and the switching circuits S37 and S27 have circuit configurations similar to circuit configurations of the driver 55 and the switching circuits S35 and S25.

In the driver 55, the reference power supply terminal of the driving circuit DRV1 and the other end of the capacitor C3 are coupled to the node N13. Further, the reference power supply terminal of the driving circuit DRV2 and the other end of the capacitor C4 are coupled to the node N11.

The switching circuit S35 includes the resistors R1 and R2, the Zener diode DZ1, the diode DD1, the resistor R3, and the transistor S11. The resistor R1 has the one end coupled to the output terminal T1 of the driver 55, and the other end coupled to the gate of the transistor S11. The resistor R2 has the one end coupled to the gate of the transistor S11, and the other end coupled to the terminal TB of the switching circuit S35. The Zener diode DZ1 has the cathode coupled to the terminal TA of the switching circuit S35, and the anode coupled to the anode of the diode DD1. The diode DD1 has the anode coupled to the anode of the Zener diode DZ1, and the cathode coupled to the resistor R3. The resistor R3 has the one end coupled to the cathode of the diode DD1, and the other end coupled to the gate of the transistor S11. The transistor S11 includes the N-type field-effect transistor, for example. The transistor S11 includes the body diode D11. The transistor S11 has the gate coupled to the resistors R1 to R3, the drain coupled to the terminal TA of the switching circuit S35, and the source coupled to the terminal TB of the switching circuit S35.

The switching circuit S25 includes the resistors R4 and R5 and the transistor S12. The resistor R4 has the one end coupled to the output terminal T2 of the driver 55, and the other end coupled to the gate of the transistor S12. The resistor R5 has the one end coupled to the gate of the transistor S12, and the other end coupled to the terminal TB of the switching circuit S25. The transistor S12 includes the N-type field-effect transistor, for example. The transistor S12 includes the body diode D12. The transistor S12 has the gate coupled to the resistors R4 and R5, the drain coupled to the terminal TA of the switching circuit S25, and the source coupled to the terminal TB of the switching circuit S25.

The switching circuit S38 has a circuit configuration similar to the circuit configuration of the switching circuit S35. The switching circuit S28 has a circuit configuration similar to the circuit configuration of the switching circuit S25.

For example, a circuit including the switching circuit S35 and the switching circuit S25 corresponds to the switching circuit S15 (FIG. 18). In the switching circuit S15, the drain of the transistor S11 is coupled to the drain of the transistor S12, and the source of the transistor S11 is coupled to the source of the transistor S12. In the switching circuit S35 and the switching circuit S25 (FIG. 20), the drain of the transistor S11 is coupled to the drain of the transistor S12. As illustrated in FIGS. 19 and 20, the source of the transistor S11 of the switching circuit S35 is coupled to the one end of the winding 63C of the transformer 63, and the source of the transistor S12 of the switching circuit S25 is coupled to the one end of the winding 63B of the transformer 63.

Similarly, for example, a circuit including the switching circuit S38 and the switching circuit S28 corresponds to the switching circuit S18 (FIG. 18). In the switching circuit S18, the drain of the transistor S11 is coupled to the drain of the transistor S12, and the source of the transistor S11 is coupled to the source of the transistor S12. In the switching circuit S38 and the switching circuit S28 (FIG. 20), the source of the transistor S11 of the switching circuit S38 is coupled to the source of the transistor S12 of the switching circuit S28. As illustrated in FIGS. 19 and 20, the drain of the transistor S11 of the switching circuit S38 is coupled to the other end of the winding 63C of the transformer 63, and the drain of the transistor S12 of the switching circuit S28 is coupled to the other end of the winding 63B of the transformer 63.

Here, for example, the circuit including the switching circuit S35 and the switching circuit S25 corresponds to a specific but non-limiting example of the "switching circuit" in one embodiment of the disclosure. For example, the driver 55 corresponds to a specific but non-limiting example of the "driver" in one embodiment of the disclosure.

In this electric power conversion system, in the precharge period P1, the output impedance of the output terminal T1 of the driver 55 is caused to be in the high impedance state, the output impedance of the output terminal T1 of the driver 56 is caused to be in the high impedance state, the output impedance of the output terminal T1 of the driver 57 is caused to be in the high impedance state, and the output impedance of the output terminal T1 of the driver 58 is caused to be in the high impedance state, as in the foregoing example embodiment. This makes it possible to prevent an excessive voltage from being applied to the transistor S11 in each of the switching circuits S35 to S38 that each include the Zener diode DZ1. The switching circuits S25 and S26 are coupled to the one end of the winding 63B via the node N11, and the switching circuits S27 and S28 are coupled to the other end of the winding 63B via the node N12. The switching circuits S35 and S36 are coupled to the one end of the winding 63C via the node N13, and the switching circuits S37 and S38 are coupled to the other end of the winding 63C via the node N14. Operating conditions of the switching circuits S25 to S28 are thus substantially the same as operating conditions of the switching circuits S35 to S38. Accordingly, preventing an excessive voltage from being applied to the transistor S11 in each of the switching circuits S35 to S38 makes it possible to prevent an excessive voltage from being applied to the transistor S12 in each of the switching circuits S25 to S28.

Circuit Example 3

Figure 21:
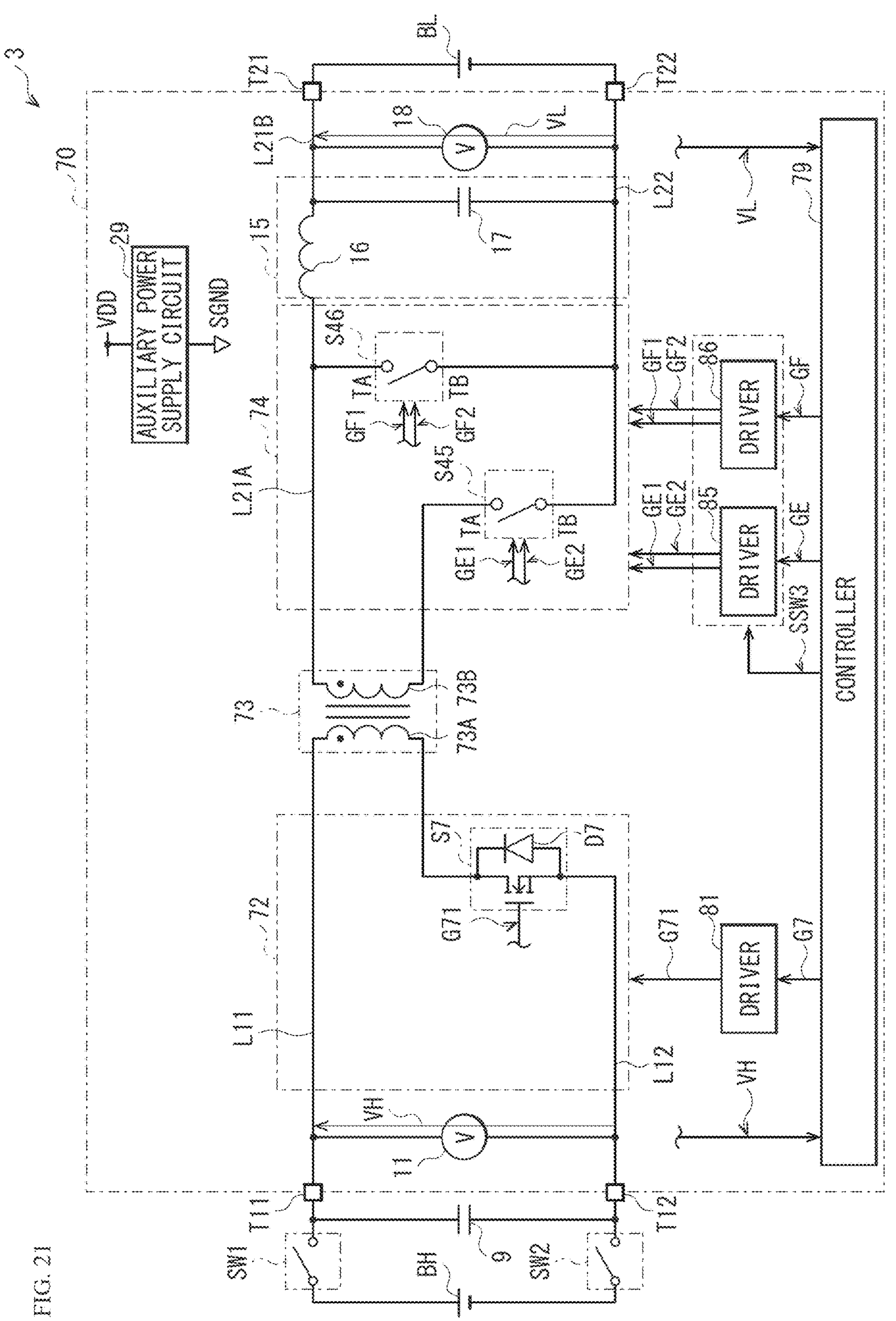
FIG. 21 is a circuit diagram illustrating a configuration example of an electric power conversion system according to another modification example.

FIG. 21 illustrates a configuration example of another electric power conversion system 3 according to the present modification example. The electric power conversion system 3 includes an electric power conversion apparatus 70.

The electric power conversion apparatus 70 is what is called a forward converter. The electric power conversion apparatus 70 includes a switcher 72, a driver 81, a transformer 73, a rectifier 74, drivers 85 and 86, and a controller 79.

The switcher 72 includes a transistor S7. The transistor S7 is a switching device that performs a switching operation, based on a gate signal G71. The transistor S7 includes a body diode D7, as with the transistors S1 to S4 according to the foregoing example embodiment. The transistor S7 has a drain coupled to a winding 73A (described later) of the transformer 73, a gate to be supplied with the gate signal G71, and a source coupled to the reference voltage line L12.

The driver 81 is configured to generate the gate signal G71, based on a gate signal G7 supplied from the controller 79, and to drive the transistor S7 through the use of the gate signal G71.

The transformer 73 includes windings 73A and 73B. The winding 73A has one end coupled to the voltage line L11, and another end coupled to the drain of the transistor S7 of the switcher 72. The winding 73B has one end coupled to the voltage line L21A, and another end coupled to a switching circuit S45 (described later) of the rectifier 74.

The rectifier 74 includes switching circuits S45 an S46. The switching circuit S45 has the terminal TA coupled to the other end of the winding 73B, and the terminal TB coupled to the reference voltage line L22. The switching circuit S45 has a control terminal to be supplied with the gate signals GE1 and GE2. The switching circuit S46 has the terminal TA coupled to the voltage line L21A, and the terminal TB coupled to the reference voltage line L22. The switching circuit S46 has a control terminal to be supplied with the gate signals GF1 and GF2. The switching circuits S45 and S46 each have a circuit configuration similar to the circuit configuration of the switching circuit S5 (FIG. 2) according to the foregoing example embodiment.

The driver 85 is configured to generate the gate signals GE1 and GE2, based on the gate signal GE supplied from the controller 79, and to drive the switching circuit S45 through the use of the gate signals GE1 and GE2. The driver 86 is configured to generate the gate signals GF1 and GF2, based on the gate signal GF supplied from the controller 79, and to drive the switching circuit S46 through the use of the gate signals GF1 and GF2. The drivers 85 and 86 each have a circuit configuration similar to the circuit configuration of the driver 25 (FIG. 2) according to the foregoing example embodiment.

As with the controller 19 according to the foregoing example embodiment, the controller 79 is configured to control the operation of the electric power conversion apparatus 70 by controlling the operations of the switcher 72 and the rectifier 74, based on the voltage VH detected by the voltage sensor 11 and the voltage VL detected by the voltage sensor 18. In the precharge period P1, for example, the controller 79 may generate both the gate signals GE and GF, or may maintain the gate signal GF at the low level while generating the gate signal GE.

In the electric power conversion system 3, in the precharge period P1, the output impedance of the output terminal T1 of the driver 85 is caused to be in the high impedance state, and the output impedance of the output terminal T1 of the driver 86 is caused to be in the high impedance state. This makes it possible to prevent an excessive voltage from being applied to the transistors S11 and S12 in each of the switching circuits S45 and S46.

In this way, the present technology is applicable to various electric power conversion apparatuses.

Other Modification Examples

Further, any two or more of these modification examples may be combined.

The disclosure has been described hereinabove with reference to the example embodiment and the modification examples. However, embodiments of the disclosure are not limited to the example embodiment and the modification examples, and may be modified in a variety of ways.

For example, in the foregoing example embodiment, as illustrated in FIG. 2, two transistors S11 and S12 are provided in each of the switching circuits S5 and S6; however, this is non-limiting. Alternatively, for example, three or more transistors may be provided. Specifically, for example, two or more circuits each including the resistors R1 to R3, the Zener diode DZ1, the diode DD1, and the transistor S11 may be provided, or two or more circuits each including the resistors R4 and R5 and the transistor S12 may be provided.

For example, the Zener diode DZ1 is provided in the foregoing example embodiment. Alternatively, for example, diodes coupled in multiple stages may be provided. In this case also, when the voltage at the drain of the transistor S11 is becoming higher than a predetermined voltage, the diodes are turned on to raise the gate voltage of the transistor S11 and cause the transistor S11 to be transiently on. The drain-source voltage VDSF of each of the transistors S11 and S12 is thereby clamped, which makes it possible to prevent an excessive voltage from being applied to the transistors S11 and S12.

For example, in the foregoing example embodiment, the step-down operation is performed in the electric power conversion operation; however, this is non-limiting, and a step-up operation may be performed.

For example, in the foregoing example embodiment, a unidirectional conversion operation of supplying electric power from the high voltage battery BH to the low voltage battery BL is performed in the electric power conversion operation; however, this is non-limiting. For example, in the electric power conversion operation, a bidirectional conversion operation may be performed by providing a mode of supplying electric power from the high voltage battery BH to the low voltage battery BL and a mode of supplying electric power from the low voltage battery BL to the high voltage battery BH. In this case also, in the preparation period before performing the electric power conversion operation in the mode of supplying electric power from the high voltage battery BH to the low voltage battery BL, the capacitor 9 is chargeable based on electric power supplied from the low voltage battery BL.

Further, for example, the circuit configuration of the switcher, the circuit configuration of the rectifier, the operation waveforms of the gate signals, etc. in the foregoing example embodiment and the modification examples are merely examples, and may be modified as appropriate.

It is possible to achieve at least the following configurations from the foregoing example embodiments and modification examples of the disclosure.

(1)

An electric power conversion apparatus including:

a first electric power terminal;

a switcher coupled to the first electric power terminal and including one or more switching devices;

a transformer including a first winding and a second winding, the first winding being coupled to the switcher;

a rectifier coupled to the second winding and including a switching circuit that includes a first switching device and a second switching device, the first switching device being operable based on a first control signal, the second switching device being operable based on a second control signal;

a smoother coupled to the rectifier and including an inductor;

a second electric power terminal coupled to the smoother;

a controller configured to control operations of the switcher and the rectifier; and a driver configured to drive the switching circuit, based on an instruction from the controller, in which the first switching device and the second switching device each include a first terminal, a second terminal, and a control terminal, the switching circuit further includes a first device provided on a first path and configured to clamp a voltage, the first path coupling the first terminal of the first switching device and the control terminal of the first switching device to each other, the driver includes a first output terminal and a second output terminal, and is configured to, based on a signal supplied from the controller, output the first control signal from the first output terminal and output the second control signal from the second output terminal, and the controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

(2)

The electric power conversion apparatus according to (1), in which the switching circuit further includes a second device provided on the first path and configured to block a current to flow through the first path in a direction from the control terminal to the first terminal.

(3)

The electric power conversion apparatus according to (1) or (2), in which the first terminal of the first switching device and the first terminal of the second switching device are coupled to each other, and the second terminal of the first switching device and the second terminal of the second switching device are coupled to each other.

(4)

The electric power conversion apparatus according to (1) or (2), in which the second winding includes two windings, the first terminal of the first switching device and the first terminal of the second switching device are coupled to each other, the second terminal of the first switching device is coupled to one of the two windings, and the second terminal of the second switching device is coupled to another of the two windings.

(5)

The electric power conversion apparatus according to (1) or (2), in which the second winding includes two windings, the first terminal of the first switching device is coupled to one of the two windings, the first terminal of the second switching device is coupled to another of the two windings, and the second terminal of the first switching device and the second terminal of the second switching device are coupled to each other.

(6)

The electric power conversion apparatus according to any one of (1) to (5), in which the driver includes:

a driving circuit configured to output the first control signal from the first output terminal; and a switch configured to switch on and off supply of power to the driving circuit, and the controller is configured to set the output impedance of the first output terminal of the driver to the high impedance state by turning off the switch.

(7)

The electric power conversion apparatus according to any one of (1) to (5), in which the driver includes:

a driving circuit configured to output the second control signal from the second output terminal; and a switch provided on a path coupling an output terminal of the driving circuit and the first output terminal to each other, and the controller is configured to set the output impedance of the first output terminal of the driver to the high impedance state by turning off the switch.

(8)

The electric power conversion apparatus according to any one of (1) to (5), in which the driver includes a driving circuit configured to output the first control signal from the first output terminal, the driving circuit includes:

a first driving switching device provided on a path coupling a first power supply node and an output terminal of the driving circuit to each other; and a second driving switching device provided on a path coupling a second power supply node and the output terminal of the driving circuit to each other, and the controller is configured to set the output impedance of the first output terminal of the driver to the high impedance state by performing control to turn off both the first driving switching device and the second driving switching device.

(9)

The electric power conversion apparatus according to any one of (1) to (5), in which the switching circuit further includes a third device provided on a second path and configured to clamp a voltage, the second path coupling the first terminal of the second switching device and the control terminal of the second switching device to each other, the controller is configured to set the output impedance of each of the first output terminal and the second output terminal of the driver to the high impedance state in the predetermined period, and the driver is configured to:

output a pulse signal as the first control signal and set the output impedance of the second output terminal of the driver to the high impedance state in a first period; and output a pulse signal as the second control signal and set the output impedance of the first output terminal of the driver to the high impedance state in a second period.

(10) The electric power conversion apparatus according to any one of (1) to (9), in which the switching circuit further includes a resistor provided on the first path.

(11) The electric power conversion apparatus according to any one of (1) to (10), in which the switching circuit further includes a first capacitor having one end coupled to the first terminal of the first switching device and another end coupled to the control terminal of the first switching device.

(12)

The electric power conversion apparatus according to any one of (1) to (11), in which the first device includes a Zener diode.

(13)

The electric power conversion apparatus according to (2), in which the second device includes a diode including an anode led to the first terminal and a cathode led to the control terminal.

(14)

The electric power conversion apparatus according to any one of (1) to (13), in which the first electric power terminal is to be coupled to a second capacitor.

(15)

An electric power conversion system including:

a first battery including a first terminal and a second terminal;

a second capacitor including a first terminal and a second terminal;

a first switch provided on a path coupling the first terminal of the first battery and the first terminal of the second capacitor to each other;

a second switch provided on a path coupling the second terminal of the first battery and the second terminal of the second capacitor to each other;

an electric power conversion apparatus; and a second battery, in which the electric power conversion apparatus includes a first electric power terminal including a first coupling terminal and a second coupling terminal, the first coupling terminal being coupled to the first terminal of the second capacitor, the second coupling terminal being coupled to the second terminal of the second capacitor, a switcher coupled to the first electric power terminal and including one or more switching devices, a transformer including a first winding and a second winding, the first winding being coupled to the switcher, a rectifier coupled to the second winding and including a switching circuit that includes a first switching device and a second switching device, the first switching device being operable based on a first control signal, the second switching device being operable based on a second control signal;

a smoother coupled to the rectifier and including an inductor;

a second electric power terminal coupled to the smoother and to the second battery;

a controller configured to control operations of the switcher and the rectifier; and a driver configured to drive the switching circuit, based on an instruction from the controller, wherein the first switching device and the second switching device each include a first terminal, a second terminal, and a control terminal, the switching circuit further includes a first device provided on a first path and configured to clamp a voltage, the first path coupling the first terminal of the first switching device and the control terminal of the first switching device to each other, the driver includes a first output terminal and a second output terminal, and is configured to, based on a signal supplied from the controller, output the first control signal from the first output terminal and output the second control signal from the second output terminal, and the controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

An electric power conversion apparatus and an electric power conversion system according to at least one embodiment of the disclosure each make it possible to prevent an excessive voltage from being applied to switching devices.

The invention claimed is:

1. An electric power conversion apparatus comprising:

a first electric power terminal;

a switcher coupled to the first electric power terminal and including one or more switching devices;

a transformer including a first winding and a second winding, the first winding being coupled to the switcher;

a rectifier coupled to the second winding and including a switching circuit that includes a first switching device and a second switching device, the first switching device being operable based on a first control signal, the second switching device being operable based on a second control signal;

a smoother coupled to the rectifier and including an inductor;

a second electric power terminal coupled to the smoother;

a controller configured to control operations of the switcher and the rectifier; and a driver configured to drive the switching circuit, based on an instruction from the controller, wherein the first switching device and the second switching device each include a first terminal, a second terminal, and a control terminal, the switching circuit further includes a first device provided on a first path and configured to clamp a voltage, the first path coupling the first terminal of the first switching device and the control terminal of the first switching device to each other, the driver includes a first output terminal and a second output terminal, and is configured to, based on a signal supplied from the controller, output the first control signal from the first output terminal and output the second control signal from the second output terminal, and the controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

2. The electric power conversion apparatus according to claim 1, wherein the switching circuit further includes a second device provided on the first path and configured to block a current to flow through the first path in a direction from the control terminal to the first terminal.

3. The electric power conversion apparatus according to claim 1, wherein the first terminal of the first switching device and the first terminal of the second switching device are coupled to each other, and the second terminal of the first switching device and the second terminal of the second switching device are coupled to each other.

4. The electric power conversion apparatus according to claim 1, wherein the second winding includes two windings, the first terminal of the first switching device and the first terminal of the second switching device are coupled to each other, the second terminal of the first switching device is coupled to one of the two windings, and the second terminal of the second switching device is coupled to another of the two windings.

5. The electric power conversion apparatus according to claim 1, wherein the second winding includes two windings, the first terminal of the first switching device is coupled to one of the two windings, the first terminal of the second switching device is coupled to another of the two windings, and the second terminal of the first switching device and the second terminal of the second switching device are coupled to each other.

6. The electric power conversion apparatus according to claim 1, wherein the driver includes:

a driving circuit configured to output the first control signal from the first output terminal; and a switch configured to switch on and off supply of power to the driving circuit, and the controller is configured to set the output impedance of the first output terminal of the driver to the high impedance state by turning off the switch.

7. The electric power conversion apparatus according to claim 1, wherein the driver includes:

a driving circuit configured to output the second control signal from the second output terminal; and a switch provided on a path coupling an output terminal of the driving circuit and the first output terminal to each other, and the controller is configured to set the output impedance of the first output terminal of the driver to the high impedance state by turning off the switch.

8. The electric power conversion apparatus according to claim 1, wherein the driver includes a driving circuit configured to output the first control signal from the first output terminal, the driving circuit includes:

a first driving switching device provided on a path coupling a first power supply node and an output terminal of the driving circuit to each other; and a second driving switching device provided on a path coupling a second power supply node and the output terminal of the driving circuit to each other, and the controller is configured to set the output impedance of the first output terminal of the driver to the high impedance state by performing control to turn off both the first driving switching device and the second driving switching device.

9. The electric power conversion apparatus according to claim 1, wherein the switching circuit further includes a third device provided on a second path and configured to clamp a voltage, the second path coupling the first terminal of the second switching device and the control terminal of the second switching device to each other, the controller is configured to set the output impedance of each of the first output terminal and the second output terminal of the driver to the high impedance state in the predetermined period, and the driver is configured to:

output a pulse signal as the first control signal and set the output impedance of the second output terminal of the driver to the high impedance state in a first period; and output a pulse signal as the second control signal and set the output impedance of the first output terminal of the driver to the high impedance state in a second period.

10. The electric power conversion apparatus according to claim 1, wherein the switching circuit further includes a resistor provided on the first path.

11. The electric power conversion apparatus according to claim 1, wherein the switching circuit further includes a first capacitor having one end coupled to the first terminal of the first switching device and another end coupled to the control terminal of the first switching device.

12. The electric power conversion apparatus according to claim 1, wherein the first device comprises a Zener diode.

13. The electric power conversion apparatus according to claim 2, wherein the second device comprises a diode including an anode led to the first terminal and a cathode led to the control terminal.

14. The electric power conversion apparatus according to claim 1, wherein the first electric power terminal is to be coupled to a second capacitor.

15. An electric power conversion system comprising:

a first battery including a first terminal and a second terminal;

a second capacitor including a first terminal and a second terminal;

a first switch provided on a path coupling the first terminal of the first battery and the first terminal of the second capacitor to each other;

a second switch provided on a path coupling the second terminal of the first battery and the second terminal of the second capacitor to each other;

an electric power conversion apparatus; and a second battery, wherein the electric power conversion apparatus includes a first electric power terminal including a first coupling terminal and a second coupling terminal, the first coupling terminal being coupled to the first terminal of the second capacitor, the second coupling terminal being coupled to the second terminal of the second capacitor, a switcher coupled to the first electric power terminal and including one or more switching devices, a transformer including a first winding and a second winding, the first winding being coupled to the switcher, a rectifier coupled to the second winding and including a switching circuit that includes a first switching device and a second switching device, the first switching device being operable based on a first control signal, the second switching device being operable based on a second control signal;

a smoother coupled to the rectifier and including an inductor;

a second electric power terminal coupled to the smoother and to the second battery;

a controller configured to control operations of the switcher and the rectifier; and a driver configured to drive the switching circuit, based on an instruction from the controller, wherein the first switching device and the second switching device each include a first terminal, a second terminal, and a control terminal, the switching circuit further includes a first device provided on a first path and configured to clamp a voltage, the first path coupling the first terminal of the first switching device and the control terminal of the first switching device to each other, the driver includes a first output terminal and a second output terminal, and is configured to, based on a signal supplied from the controller, output the first control signal from the first output terminal and output the second control signal from the second output terminal, and the controller is configured to, in a predetermined period that is different from a period in which electric power is supplied from the first electric power terminal toward the second electric power terminal, control the operations of the switcher and the rectifier to cause electric power to be supplied from the second electric power terminal toward the first electric power terminal, and set an output impedance of the first output terminal of the driver to a high impedance state.

* * * * *